United States Patent
Li et al.

(10) Patent No.: US 9,297,394 B2
(45) Date of Patent: Mar. 29, 2016

(54) METAL SHEETS AND PLATES HAVING FRICTION-REDUCING TEXTURED SURFACES AND METHODS OF MANUFACTURING SAME

(71) Applicant: Alcoa Inc., Pittsburgh, PA (US)

(72) Inventors: Ming Li, Murrysville, PA (US); James M. Marinelli, Murrysville, PA (US); Jiantao Liu, Murrysville, PA (US); Paul E. Magnusen, Pittsburgh, PA (US); Simon Sheu, Murrysville, PA (US); Markus B. Heinimann, New Alexandria, PA (US); John Liu, Murrysville, PA (US); Luis Fanor Vega, Cheswick, PA (US)

(73) Assignee: Alcoa Inc., Pittsburgh, PA (US)

( * ) Notice: Subject to any disclaimer, the term of this patent is extended or adjusted under 35 U.S.C. 154(b) by 324 days.

(21) Appl. No.: 14/076,689

(22) Filed: Nov. 11, 2013

(65) Prior Publication Data

US 2014/0248453 A1 Sep. 4, 2014

Related U.S. Application Data

(60) Continuation of application No. 13/425,015, filed on Mar. 20, 2012, now Pat. No. 8,578,747, which is a division of application No. 12/536,160, filed on Aug. 5, 2009, now Pat. No. 8,444,092.

(Continued)

(51) Int. Cl.
*F15D 1/00* (2006.01)
*B21B 1/22* (2006.01)
(Continued)

(52) U.S. Cl.
CPC .............. *F15D 1/004* (2013.01); *B21B 1/227* (2013.01); *F15D 1/12* (2013.01); *B21B 2003/001* (2013.01); *Y10T 428/12389* (2015.01); *Y10T 428/1359* (2015.01)

(58) Field of Classification Search
CPC ............ B21B 1/227; F15D 1/004; F15D 1/12
USPC .............. 244/198, 199.1, 200, 204, 130, 133
See application file for complete search history.

(56) References Cited

U.S. PATENT DOCUMENTS 2,443,170 A * 6/1948 Smith .................... B21H 8/005
244/133
3,065,940 A * 11/1962 Eckstein .................. B64C 3/26
244/130
4,180,290 A * 12/1979 Drews .................... B62D 35/00
180/903

(Continued)

*Primary Examiner* — Justin Benedik
(74) *Attorney, Agent, or Firm* — Greenberg Traurig, LLP

(57) ABSTRACT

Metal sheets and plates having friction-reducing textured surfaces and methods of manufacturing these metal sheets and plates are disclosed herein. In an embodiment, there is provided a transportation vessel that includes at least one metal product having at least one surface that is substantially grooved, wherein the substantially grooved surface forms a riblet topography, the riblet topography including a multiplicity of adjacent permanently rolled longitudinal riblets running along at least a part of the surface, and wherein the riblet topography is coated with at least one coating sufficiently designed and applied to preserve the riblet topography. In an embodiment, the multiplicity of adjacent permanently rolled longitudinal riblets results in a friction-reducing textured surface. In an embodiment, metal product is used in fabricating at least a portion of an aircraft. In an embodiment, metal product is used in fabricating at least a portion of a rotor blade.

22 Claims, 30 Drawing Sheets

Related U.S. Application Data

(60) Provisional application No. 61/188,055, filed on Aug. 5, 2008, provisional application No. 61/170,390, filed on Apr. 17, 2009, provisional application No. 61/170,410, filed on Apr. 17, 2009.

(51) Int. Cl.
*F15D 1/12* (2006.01)
*B21B 3/00* (2006.01)

(56) References Cited

U.S. PATENT DOCUMENTS

| | | | | |
|---|---|---|---|---|
| 4,338,807 A * | 7/1982 | Ricono | B21B 1/02 | 72/187 |
| 4,650,138 A * | 3/1987 | Grose | B64C 21/10 | 138/38 |
| 4,706,910 A * | 11/1987 | Walsh | B64C 21/10 | 114/67 R |
| 4,750,693 A * | 6/1988 | Lobert | B64C 21/10 | 138/38 |
| 4,907,765 A * | 3/1990 | Hirschel | B64C 21/10 | 244/130 |
| 4,932,612 A * | 6/1990 | Blackwelder | B64C 21/025 | 244/130 |
| 4,978,583 A * | 12/1990 | Wakui | B21B 1/227 | 219/121.68 |
| 4,986,496 A * | 1/1991 | Marentic | B05D 5/02 | 244/130 |
| 5,114,099 A * | 5/1992 | Gao | B64C 21/10 | 244/130 |
| 5,669,436 A * | 9/1997 | Papich | B22D 11/008 | 164/461 |
| 5,971,326 A * | 10/1999 | Bechert | B62D 35/00 | 244/130 |
| 6,092,766 A * | 7/2000 | LaRoche | B64C 21/10 | 244/198 |
| 6,431,256 B1 * | 8/2002 | Ferretti | B22D 11/0651 | 164/428 |
| 2004/0126541 A1* | 7/2004 | Dietz | B32B 27/08 | 428/167 |
| 2004/0186201 A1* | 9/2004 | Stoffer | C09C 1/56 | 523/215 |
| 2009/0110935 A1* | 4/2009 | Lewis | C08J 7/047 | 428/421 |
| 2011/0073710 A1* | 3/2011 | Rawlings | B64C 21/10 | 244/130 |

* cited by examiner

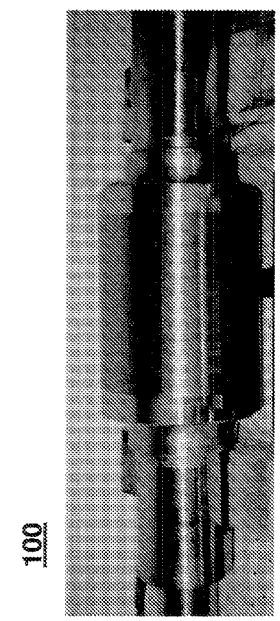
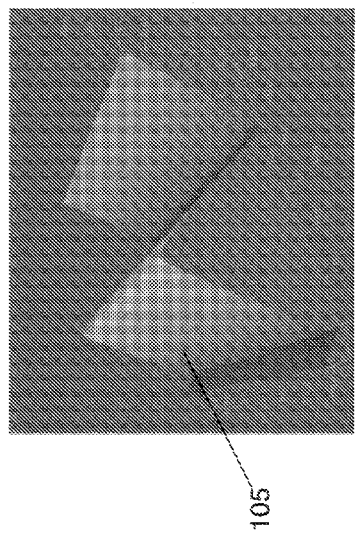
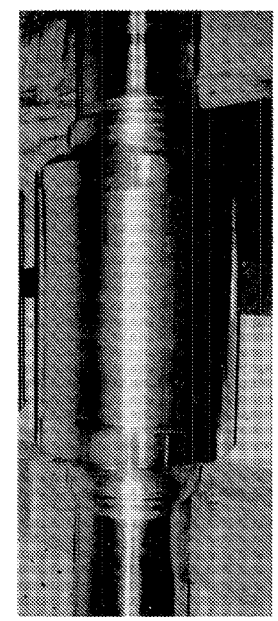
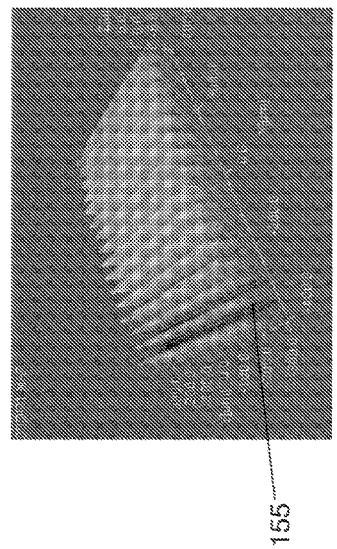
FIG. 1A
FIG. 1B
FIG. 1C
FIG. 1D

| Riblet Type | Spacing S (μm) | Height H (μm) | Radius R (μm) | Radius r (μm) | Angle θ (degree) |
|---|---|---|---|---|---|
| V-Riblets | 50 - 2000 | 25-1000 | --- | --- | 90 |
| Rectangle-Riblets | 50 - 2000 | 25-1000 | --- | --- | |
| Shark Scale-Riblets | 50 - 2000 | 25-1000 | 75-250 | --- | 60-90 |
| Modified Shark Scale-Riblets | 50 - 2000 | 25-1000 | 250-400 | 50-150 | |

FIG. 3

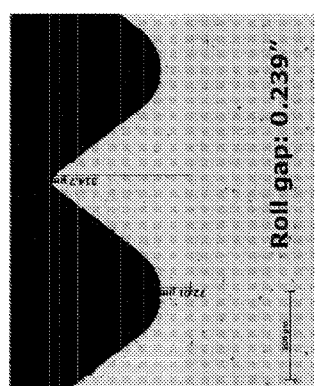
FIG. 6A
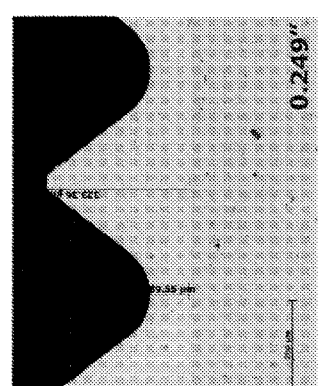
FIG. 6B
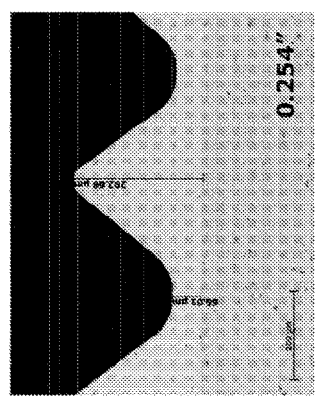
FIG. 6C
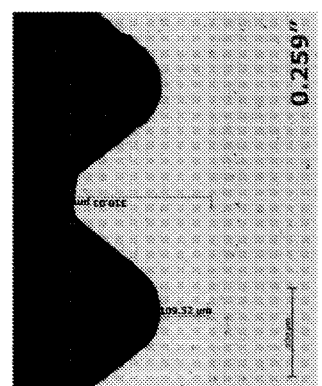
FIG. 6D
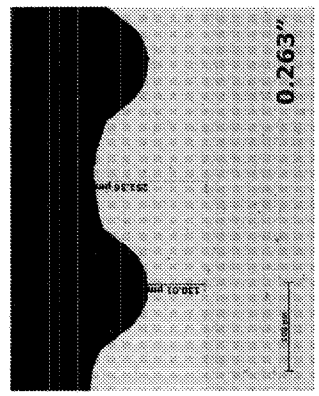
FIG. 6E
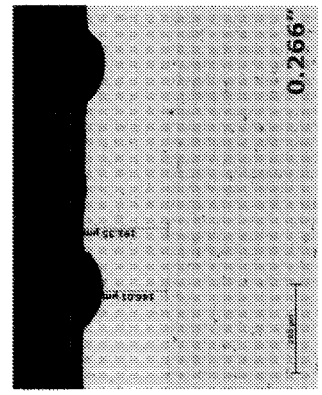
FIG. 6F
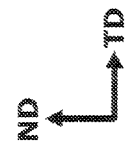

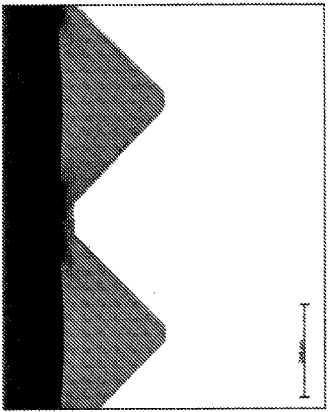

FIG. 20A

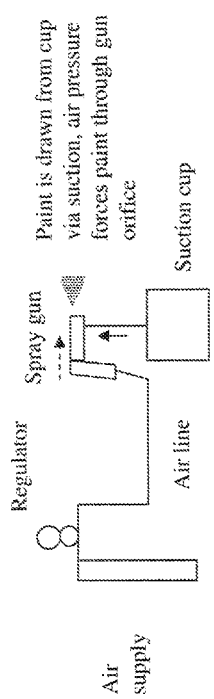

FIG. 20B

| Variable | Primer | Topcoat |
|---|---|---|
| Paint type | Akzo Nobel 10P20-44 chromated high solids (75%) epoxy with EC-265 curing agent | Akzo Nobel 24F20-101 72% solids gray polyurethane with PC-226 curing agent |
| Paint application method | Manual | Manual |
| Paint delivery method | Suction cup | Suction cup |
| Spray gun type | Badger Model 400 | Badger Model 400 |
| Spray gun orifice | Medium designation | Medium designation |
| Paint viscosity | 18 s using #2 Zahn cup viscosity cup | 26 s using #2 Zahn cup viscosity cup |
| Reduction solvent | None | None |
| Number of feed turns | 1.5 turns | 1.25 turns |
| Air pressure | 20 psi | 20 psi |
| Number of spray passes | 1 | 4 |
| Paint cure condition | Room temperature for 24 hours | Room temperature for 24 hours |

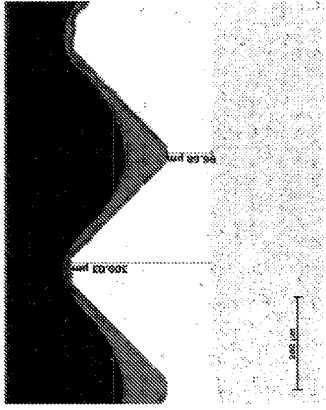

FIG. 21A

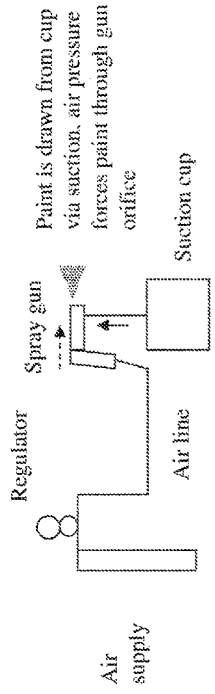

FIG. 21B

| Variable | Primer | Topcoat |
|---|---|---|
| Paint type | Akzo Nobel 10P20-44, chromated high solids (75%) epoxy with EC-265 curing agent | Akzo Nobel 24F20-101 72% solids gray polyurethane with PC-226 curing agent |
| Paint application method | Manual | Manual |
| Paint delivery method | Suction cup | Suction cup |
| Spray gun type | Badger Model 400 | Badger Model 400 |
| Spray gun orifice | Medium designation | Medium designation |
| Paint viscosity | 19 s using #2 Zahn cup viscosity cup | 24 s using #2 Zahn cup viscosity cup |
| Reduction solvent | None | None |
| Number of feed turns | 1.5 | 3 |
| Air pressure | 20 psi | 20 psi |
| Number of spray passes | 3 | 3 |
| Paint cure condition | Room temperature for 24 hours | Room temperature for 24 hours |

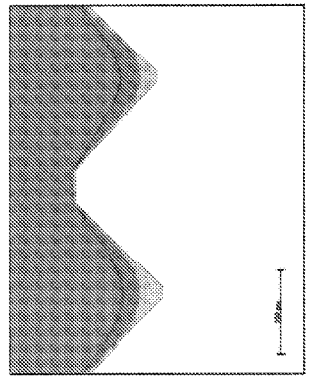

FIG. 22A

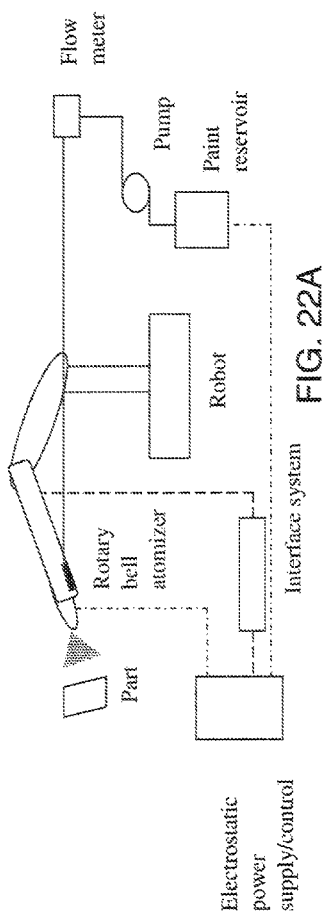

FIG. 22B

| Variable | Primer | Topcoat |
|---|---|---|
| Paint type | Akzo Nobel 10P20-44 chromated high solids (75%) epoxy with EC-265 curing agent | Kion 1067A polysilazane |
| Paint application method | Manual | Robotic |
| Paint delivery method | Suction cup | Rotary electrostatic |
| Robotic system | N/A | ABB |
| Spray gun type | Badger Model 400 | N/A |
| Spray gun orifice | Medium designation | N/A |
| Paint viscosity | 18 s using #2 Zahn cup viscosity cup | 77 s using #1 Ford Cup |
| Bell atomizer type | N/A | ITW |
| Voltage | N/A | 30 kV |
| Reduction solvent | None | Butyl acetate |
| Number of feed turns | 1.5 | N/A |
| Air pressure | 20 psi | N/A |
| Number of spray passes | 1 | 10 |
| Paint cure condition | Room temperature for 24 hours | 310 F for 30 minutes |

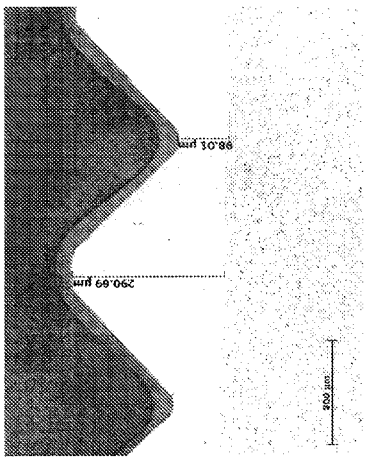

FIG. 23B

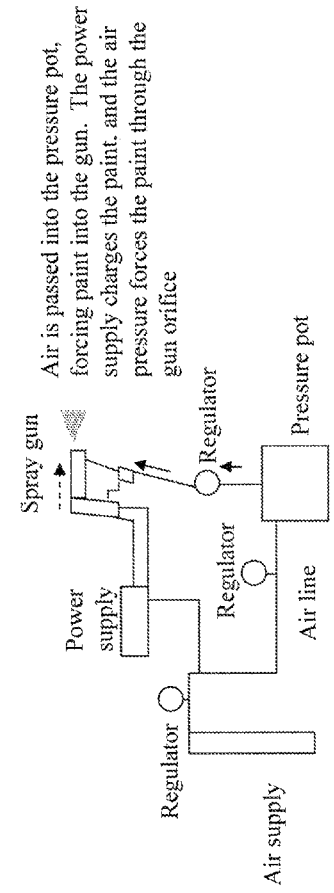

FIG. 23A

| Variable | Primer | Topcoat |
|---|---|---|
| Paint type | Akzo Nobel 10P20-44, chromated high solids (75%) epoxy with EC-265 curing agent | Akzo Nobel 24F20-101 72% solids gray polyurethane with PC-226 curing agent |
| Paint application method | Manual electrostatic | Manual electrostatic |
| Paint delivery method | Suction cup | Suction cup |
| Spray gun type | Vector R70 | Vector R70 |
| Spray gun orifice | 0.028" | 0.028" |
| Paint viscosity | 19 s using #2 Zahn cup viscosity cup | 24 s using #2 Zahn cup viscosity cup |
| Reduction solvent | None | None |
| Number of feed turns | 3 | 5 |
| Air pressure | 15 psi | 18 psi |
| Number of spray passes | 3 | 3 |
| Paint cure condition | Room temperature for 24 hours | Room temperature for 24 hours |

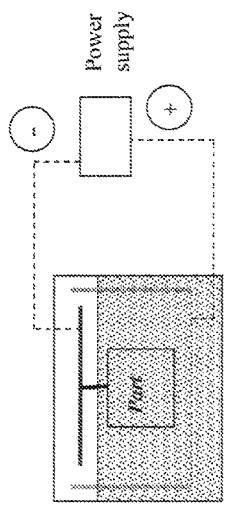

A negative charge is applied to the part, and a positive charge is applied to the paint via the anodes. This results in the paint particles being electrically attracted to the part and depositing on the part surface

FIG. 24A

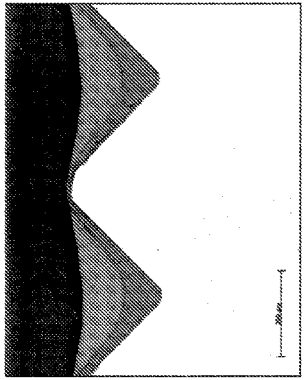

FIG. 24B

| Variable | Primer | Topcoat |
|---|---|---|
| Paint type | PPG ED6100C gray epoxy electrocoat | Akzo Nobel 24F20-101 72% solids gray polyurethane with PC-226 curing agent |
| Paint application method | Electrodeposition coating (E-coat) | Manual |
| Paint delivery method | Immersion E-coat | Suction cup |
| Spray gun type | N/A | DeVilbiss |
| Spray gun orifice | N/A | 0.070" |
| Paint viscosity | Water | 21 s using #1 Ford cup viscosity cup |
| Reduction solvent | N/A | None |
| Number of feed turns | N/A | 2 turns |
| Air pressure | N/A | 20 psi |
| Number of spray passes | N/A | 2 |
| Applied voltage | 190 volts | N/A |
| Application time | 3 min | N/A |
| Paint bath temperature | 90 F | N/A |
| Paint cure condition | 350 F for 30 minutes | Room temperature for 24 hours |

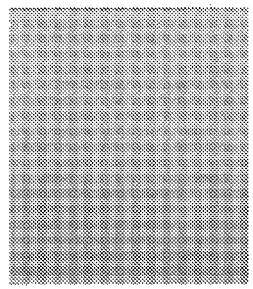
CONTROL
FIG. 26A
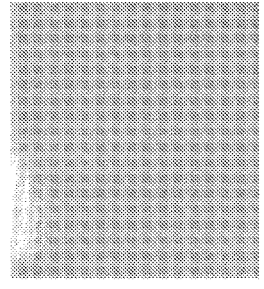
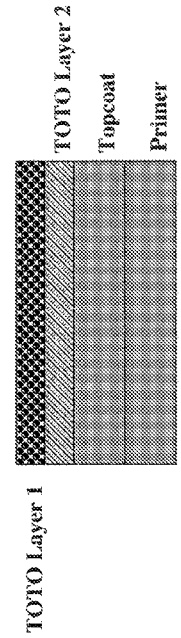
FIG. 26B
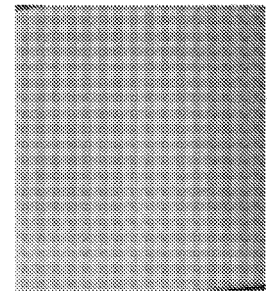
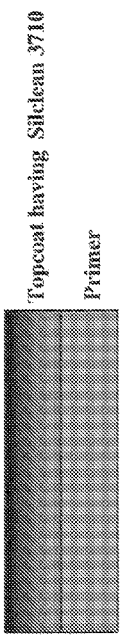
FIG. 26C

| Variable | Primer | Topcoat | FIG. 26A | FIG. 26B | FIG. 26C |
|---|---|---|---|---|---|
| Paint type | Akzo Nobel 10P20-44 chromated high solids (75%) epoxy with EC-265 curing agent | Akzo Nobel 24F20-101 72% solids gray polyurethane with PC-226 curing agent | No self-cleaning agent applied (control panel) | Mutiple layers of TOTO self-cleaning system (0.85% active ingredient solution in alcohol) applied by spray application using a gravity feed system in tandem with a high volume/low pressure spray gun | BYK Silclean 3710 mixed into 24F20-101 topcoat at 2% level, sprayed onto primed surface |
| Paint application method | Manual | Manual | | | |
| Paint delivery method | Suction cup | Suction cup | | | |
| Spray gun type | Badger Model 400 | Badger Model 400 | | | |
| Spray gun orifice | Medium designation | Heavy designation | | | |
| Paint viscosity | 18 s using #2 Zahn cup viscosity cup | 18 s using #2 Zahn cup viscosity cup | | | |
| Reduction solvent | None | None | | | |
| Number of feed turns | 2 turns | 4 turns | | | |
| Air pressure | 25 psi | 25 psi | | | |
| Number of spray passes | 4 | 6 passes | | | |
| Paint cure condition | Room temperature for 24 hours | Room temperature for 24 hours | | | |

FIG. 27

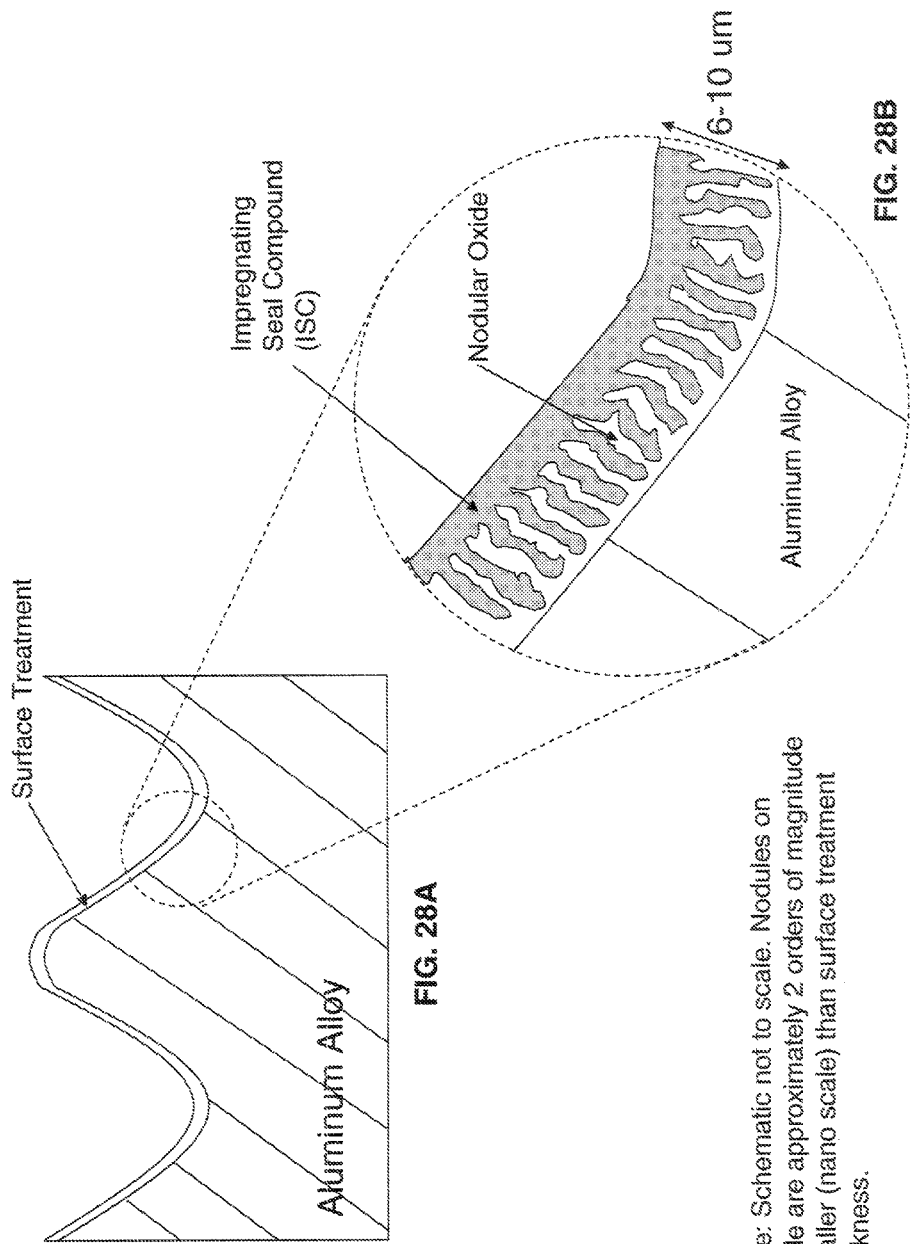

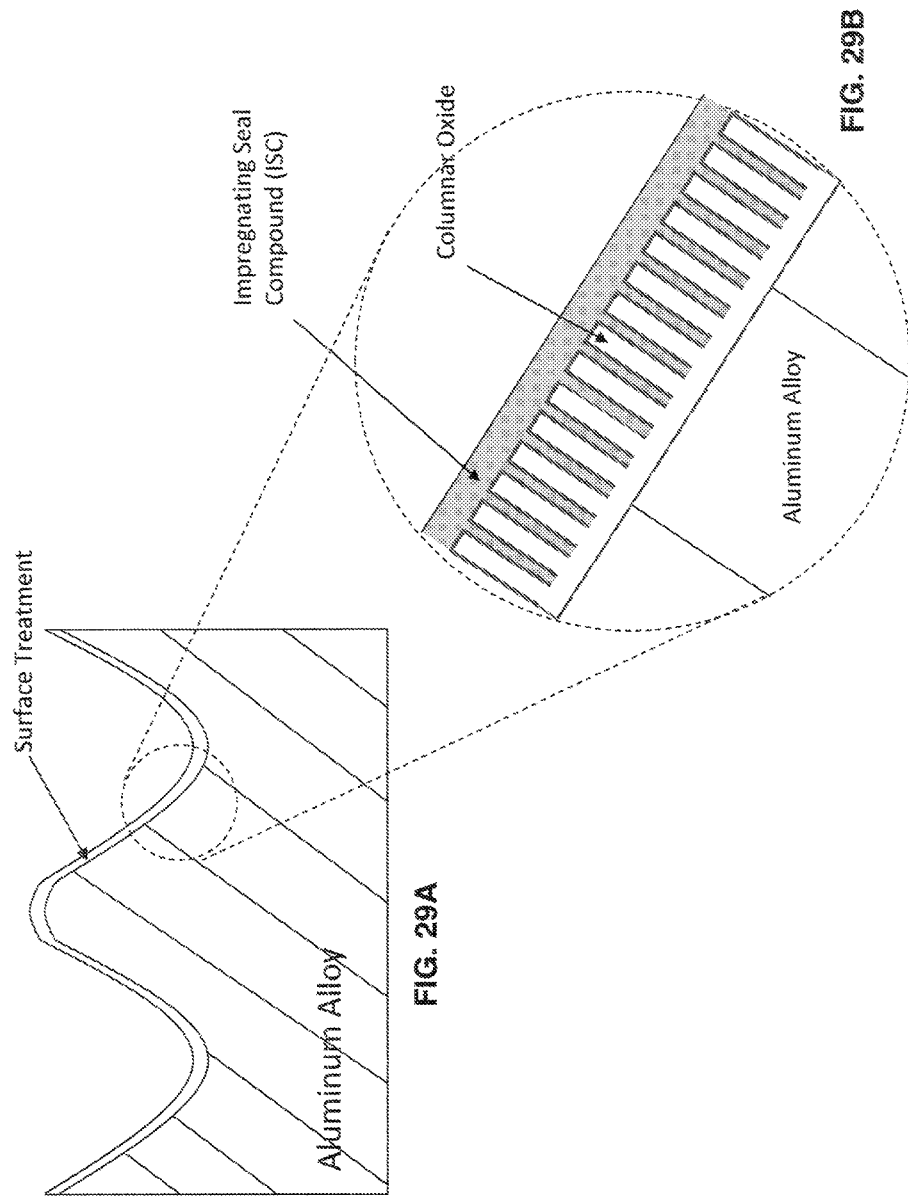

METAL SHEETS AND PLATES HAVING FRICTION-REDUCING TEXTURED SURFACES AND METHODS OF MANUFACTURING SAME

RELATED APPLICATIONS

This application is a continuation of U.S. application Ser. No. 13/425,015, filed on Mar. 20, 2012, which is a divisional of U.S. application Ser. No. 12/536,160, filed on Aug. 5, 2009, now U.S. Pat. No. 8,444,092, which claims the benefit of and priority to U.S. Provisional Application Ser. No. 61/188,055, filed Aug. 5, 2008, U.S. Provisional Application Ser. No. 61/170,390, filed Apr. 17, 2009, and U.S. Provisional Application Ser. No. 61/170,410, filed Apr. 17, 2009, the entirety of these applications are hereby incorporated herein by reference.

BACKGROUND

Drag is a mechanical force generated by a solid object moving through a fluid (a liquid or gas). When the fluid is a gas like air, it is called aerodynamic drag (or air resistance). When the fluid is a liquid like water, it is called hydrodynamic drag. In one example, sources of aerodynamic drag is the skin friction between the molecules of the air and the solid surface of a wing or fuselage (such as those found in an aircraft). In another example, sources of aerodynamic drag is the skin friction between the molecules of the air and the solid surface of rotor blades (such as those found in a wind turbine). Because the skin friction is an interaction between a solid and a gas, the magnitude of the skin friction depends on properties of both solid and gas. For the solid, a smooth, waxed surface produces less skin friction than a roughened surface. For the gas, the magnitude depends on the viscosity of the air and the relative magnitude of the viscous forces to the motion of the flow, expressed as the Reynolds number. Along the solid surface, a boundary layer of low energy flow is generated and the magnitude of the skin friction depends on conditions in the boundary layer.

SUMMARY

Metal sheets and plates having friction-reducing textured surfaces and methods of their manufacture are disclosed herein.

According to one embodiment of the present invention, there is disclosed a transportation vessel that includes at least one metal product having at least one surface that is substantially grooved, wherein the substantially grooved surface forms a riblet topography, the riblet topography including a multiplicity of adjacent permanently rolled longitudinal riblets running along at least a part of the surface, and wherein the riblet topography is coated with at least one coating sufficiently designed and applied to preserve the riblet topography. In an embodiment, the multiplicity of adjacent permanently rolled longitudinal riblets results in a friction-reducing textured surface. In an embodiment, metal product is used in fabricating at least a portion of an aircraft. In an embodiment, metal product is used in fabricating at least a portion of a rotor blade. In an embodiment, the metal product is an aluminum alloy sheet or plate. In an embodiment, the metal product is a titanium sheet or plate. In an embodiment, the metal product is a steel sheet or plate.

According to one embodiment of the present invention, there is disclosed a method of manufacturing a metal product that includes providing a substantially flat metal sheet or plate; passing the substantially flat metal sheet or plate through a rolling mill, wherein the rolling mill includes: at least one roll having an outer surface engraved with a riblet topography, wherein the riblet topography includes a multiplicity of adjacent longitudinal riblets, and at least one roll having an unaltered substantially flat outer surface; producing a substantially grooved metal sheet or plate that includes a multiplicity of adjacent permanently rolled longitudinal riblets running along at least a part of the surface; coating the substantially grooved metal sheet or plate with at least one coating sufficiently designed and applied to preserve the multiplicity of adjacent permanently rolled longitudinal riblets; and obtaining the metal product.

In an embodiment, the at least one coating is selected from the group consisting of a primer, a topcoat and an easy/self-cleaning coating. In an embodiment, the easy/self-cleaning coating is a super-hydrophilic coating. In an embodiment, the super-hydrophilic coating is a light-activated system containing anatase titanium dioxide. In an embodiment, a hydrophobic chemical additive is added to the topcoat. In an embodiment, the hydrophobic chemical additive is a functionalized siloxane system.

In an embodiment, a metal product of the present invention is used in fabricating a transportation vessel, including, but not limited to, an aircraft or air vehicle (such as an airplane, a helicopter, a missile, a glider, a balloon, and a blimp), a land vehicle (such as a car, and a train), a sea vehicle (such as a submarine, a yacht, an unmanned surface vehicle, an autonomous underwater vehicle, etc.), and a pipeline wall.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIGS. 1A-D depict two embodiments of different rolls that may be used in manufacturing metal sheets and plates having friction-reducing textured surfaces of the present invention. FIGS. 1A and 1B illustrate a roll having an engraved V-shaped riblet topography with a riblet height of about 125 µm. FIGS. 1C and 1D illustrate a roll having an engraved V-shaped riblet topography with a riblet height of about 50 µm.

FIG. 2A shows V-riblets. FIG. 2B shows rectangle-riblets. FIG. 2C shows shark scale-riblets. FIG. 2D shows modified shark scale-riblets.

FIG. 3 is a table listing various parameters (spacing, height, radius R, radius r, and angle) of the riblet geometries illustrated in FIGS. 2A-D.

FIGS. 6A-F show cross-sectional optical metallography images of riblet topographies obtained on aluminum Alclad alloy sheets of 0.270" gage, illustrating an embodiment, by passing the aluminum alloy sheet through a rolling mill at different percentage of reduction, where A represents the highest reduction and F the lowest reduction, that includes at least one roll having an outer surface engraved with a shark scale riblet topography, wherein the riblet topography on the roll includes a multiplicity of adjacent longitudinal riblets having a height of approximately 260 μm and spaced a distance apart of approximately 500 μm.

FIG. 20A shows an embodiment of a setup for applying a primer/topcoat combination using a manual suction cup approach for both primer and topcoat application on an aluminum alloy sheet or plate having a riblet topography to create an aluminum alloy product of the present invention. FIG. 20B shows a cross-sectional optical metallography image of an aluminum alloy product having V-riblets coated with a primer/topcoat combination according to the table, illustrating an embodiment.

FIG. 21A shows an embodiment of a setup for applying a primer/topcoat combination using a manual suction cup approach for both primer and topcoat application on an aluminum alloy sheet or plate having a riblet topography to create an aluminum alloy product of the present invention. FIG. 21B shows a cross-sectional optical metallography image of an aluminum alloy product having V-riblets coated with a primer/topcoat combination according to the table, illustrating an embodiment.

FIG. 22A shows an embodiment of a setup for applying a primer/topcoat combination using a manual suction cup approach for primer application and a robotic rotary electrostatic approach for topcoat application on an aluminum alloy sheet or plate having a riblet topography to create an aluminum alloy product of the present invention. FIG. 22B shows a cross-sectional optical metallography image of an aluminum alloy product having V-riblets coated with a primer/topcoat combination according to the table, illustrating an embodiment.

FIG. 23A shows an embodiment of a setup for applying a primer/topcoat combination using a manual electrostatic pressure pot approach for both primer and topcoat application on an aluminum alloy sheet or plate having a riblet topography to create an aluminum alloy product of the present invention. FIG. 23B shows a cross-sectional optical metallography image of an aluminum alloy product having modified sine wave-riblets coated with a primer/topcoat combination according to the table, illustrating an embodiment.

FIG. 24A shows an embodiment of a setup for applying a primer/topcoat combination using an electrodeposition immersion E-coat approach for primer application and a manual suction cup approach for topcoat application on an aluminum alloy sheet or plate having a riblet topography to create an aluminum alloy product of the present invention. FIG. 24B shows a cross-sectional optical metallography image of an aluminum alloy product having V-riblets coated with a primer/topcoat combination according to the table, illustrating an embodiment.

FIGS. 26A-C demonstrate that an aluminum alloy product having friction-reducing textured surfaces of an embodiment of the present invention augmented with an easy/self-cleaning component is able to exhibit improved cleanliness over a painted topography with no easy/self-cleaning component.

FIG. 27 is a table listing the painting and easy/self-cleaning agent application conditions for the aluminum alloy products having friction-reducing textured surfaces of FIGS. 26A-C.

FIGS. 28A and 28B show schematic illustrations of an embodiment of a rolled riblet profile having a surface treatment for impregnating seal compounds that allows for use of boric-sulfuric or sulfuric acid anodizing.

FIGS. 29A and 29B show schematic illustrations of an embodiment of a rolled riblet profile having a surface treatment created using a manual electrostatic approach. The riblet profile includes a deep "V" and sine wave topography.

FIG. 30A shows an aluminum alloy product of an embodiment of the present invention having a boric-sulfuric anodized and sealed standard primer and standard topcoat (no easy/self-cleaning component). FIG. 30B shows an aluminum alloy product of an embodiment of the present invention having a boric-sulfuric anodized and sealed standard primer and standard topcoat with two layers of a super-hydrophilic coating light-activated system containing anatase titanium dioxide (TOTO). FIG. 30C shows an aluminum alloy product of an embodiment of the present invention having a boric-sulfuric anodized standard primer (No sealing) coated with SDC MP101 polysiloxane with 2% TOTO mixed in. FIG. 30D shows an aluminum alloy product of an embodiment of the present invention having a boric-sulfuric anodized standard primer (No sealing) coated with Kion 1067A polysilazane with 2% TOTO mixed in.

Figure 2A:
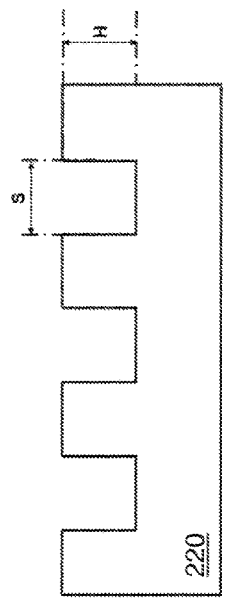
FIGS. 2A-D shows some examples of various riblet geometries that can be engraved onto an outer circumferential surface of a roll.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention.

DETAILED DESCRIPTION

In one embodiment, the present invention provides metal sheets (typically greater than about 0.001 inches and less than about 0.30 inches) and plates (typically more than about 0.30 inches) having a permanently rolled substantially grooved surface formed from a riblet topography (a texture to the otherwise smooth surface), and methods of manufacturing them. The riblet topography includes a multiplicity of adjacent longitudinal riblets running along at least part of the surface resulting in a friction-reducing textured surface. In an embodiment, the friction-reducing textured surface provides a drag reduction ranging from about five percent up to about fifteen percent. In an embodiment, the metal sheets and plates are coated with at least one coating sufficiently designed and applied to preserve the riblet topography, resulting in a metal product of the present invention. In an embodiment, a metal product of the present invention is used in fabricating a transportation vessel, including, but not limited to, an aircraft or air vehicle (such as an airplane, a helicopter, a missile, a glider, a balloon, and a blimp), a land vehicle (such as a car, and a train), a sea vehicle (such as a submarine, a yacht, an unmanned surface vehicle, an autonomous underwater vehicle, etc.), and a pipeline wall.

In one embodiment, a metal product of the present invention is used in fabricating at least a portion of an aircraft, such as a wing, a fuselage tailcone or empennage and stabilizers. In an embodiment, a metal product of the present invention is used in fabricating at least one rotor blade of a wind turbine.

In an embodiment, a metal product of the present invention is used in fabricating at least a wall of a pipeline. Aircraft should have good fuel economy, and wind turbine rotor blades must have high tip speeds to work efficiently. These requirements support the fact that both aircraft wings and rotor blades should have low aerodynamic drag.

Since drag reduction is directly related to fuel efficiency improvements, a five percent drag reduction can result in an about eleven percent fuel efficiency improvement, while a higher drag reduction will lead to even larger improvements in fuel efficiency. By measuring one or more of the following parameters including, but not limited to, mean skin friction, skin friction drag coefficient (Cdf), surface or wall shear stress, Preston pressures, pressures behind and ahead the boundary layer fence, velocity distribution downstream of the riblet topography, or wall turbulence intensity, the reduction in friction (drag) that the textured surface of the invention can provide is quantified. In an embodiment, the reduction in friction is a reduction in skin friction drag. In order to determine the drag reduction afforded by the metal sheets and plates of the present invention, experiments can be performed by using one or more of the following methods including, but not limited to, water tunnel testing, wind tunnel testing and channel flow testing (e.g., oil or water). The drag reduction can be compared to that of a smooth flat surface metal sheet or plate. Metal sheets and plates having smooth surfaces can be tested simultaneously with the metal sheets and plates of the present invention to allow a one-to-one comparison.

As used herein, "aluminum alloy" means a material including aluminum and another metal alloyed therewith, and includes one or more of the Aluminum Association 1XXX, 2XXX, 3XXX, 5XXX, 6XXX, 7XXX and 8XXX series alloys, and variants thereof. In an embodiment, an aluminum alloy of the present invention is "Alclad" or "clad" defined as a cast aluminum alloy that is coated on one or both surfaces with a metallurgically bonded, thin layer of pure aluminum or aluminum alloy, where the combination of the core and the cladding alloys is selected so that the cladding is anodic to the core.

As used herein, "aluminum alloy product" of the present invention refers to an aluminum alloy sheet or plate having at least one surface that is substantially grooved, wherein the substantially grooved surface is formed from a riblet topography, and wherein the riblet topography includes a multiplicity of adjacent permanently rolled longitudinal riblets running along at least part of the surface.

While for purposes for convenience of disclosure herein, reference has been made to the use of aluminum and particular preferred alloys for the metal sheets and plates having a permanently rolled riblet topography, the invention is not so limited. Other aluminum alloys and other metals, may be employed advantageously. For example, steel, copper, iron, titanium, and combinations thereof could be employed.

In an embodiment, the metal sheets and plates having the permanently rolled riblet topography, are fabricated from an aluminum alloy structure. In an embodiment, the aluminum alloy structure is a clad aluminum alloy, for example, an Alclad aluminum alloy structure. In an embodiment, the Alclad aluminum alloy structure is an Alclad 2524 sheet. In an embodiment, the aluminum alloy structure is a non-clad or bare aluminum alloy structure. In an embodiment, the bare aluminum alloy structure is an Al—Li sheet. In an embodiment, the bare aluminum alloy structure is a 5XXX series alloy. The aluminum alloy structure can be a heat-treatable aluminum alloy or a non-heat-treatable aluminum alloy. Non-heat-treatable alloys constitute a group of alloys that rely upon cold work and solid solution strengthening for their strength properties. They differ from heat-treatable alloys in that they do not rely on second-phase precipitates for improved strength.

The aluminum alloy structure may be any suitable aluminum alloy, but in some instance is a wrought aluminum alloy, such as any of the 1XXX, 2XXX, 3XXX, 5XXX, 6XXX, 7XXX and 8XXX series alloys, as defined by The Aluminum Association, Inc, and variants thereof. In one embodiment, the aluminum alloy structure is a 2XXX series alloy. In one embodiment, the 2XXX series alloy is a 2524 series alloy. In one embodiment, the aluminum alloy structure is a 5XXX series alloy. In one embodiment, the aluminum alloy structure is an aluminum-lithium alloy.

As used herein, the term "skin friction drag" refers to the drag that results from the viscous interaction of a fluid (a liquid or a gas) with a surface. For example, skin friction drag can be caused by the actual contact of air particles against a surface of an aircraft. Because skin friction drag is an interaction between a solid (for example, the airplane surface) and a fluid (for example, the air), the magnitude of skin friction drag depends on the properties of both the solid and the fluid. For the solid airplane, skin fiction drag can be reduced, and airspeed can be increased somewhat, by keeping an aircraft's surface highly polished and clean. For the fluid, the magnitude of the drag depends on the viscosity of the air or liquid contacting the solid surface. Along the solid surface of the airplane, a boundary layer of low energy flow is generated.

As used herein, the term "riblet topography" refers to a friction-reducing texture that has been permanently rolled onto an aluminum alloy structure, such as a sheet or plate. In an embodiment of the invention, a riblet topography includes a multiplicity of adjacent longitudinal riblets that have been permanently rolled onto an aluminum alloy structure resulting in a metal sheet or plate having a friction-reducing textured surface. In an embodiment, the friction-reducing textured surface is a surface that reduces the skin friction drag of an object that incorporates the metal sheet or plate of the present invention. In an embodiment, the metal sheets and plates of the present invention are used for manufacturing aircrafts, whether they be commercial aircrafts, military aircrafts or space aircrafts. In an embodiment, the metal sheets and plates of the present invention are used for manufacturing marine vessels, whether they be surface ships or those designed to be operated in a submerged condition. In an embodiment, the metal sheets and plates of the present invention are used for manufacturing trains, such as fast trains or "high speed" trains. In an embodiment, the metal sheets and plates of the present invention are used for manufacturing rotor blades, such as those found in a helicopter or in a wind turbine. In an embodiment, the metal sheets and plates of the present invention are used for manufacturing a wall of a pipeline.

In an embodiment, a method of manufacturing a metal product of the present invention includes providing a substantially flat metal sheet or plate; passing the substantially flat metal sheet or plate through a rolling mill, wherein the rolling mill includes at least one roll having an outer surface engraved with a riblet topography, wherein the riblet topography includes a multiplicity of adjacent longitudinal riblets; and at least one roll having an unaltered substantially flat outer surface; producing a substantially grooved metal sheet or plate that includes a multiplicity of adjacent permanently rolled longitudinal riblets running along at least a part of the surface coating the substantially grooved metal sheet or plate with at least one coating sufficiently designed and applied to preserve the multiplicity of adjacent permanently rolled longitudinal riblets; and obtaining the metal product.

In an embodiment, each riblet in the riblet topography has an equal or uniform height. The geometry of the riblets in the riblet topography can be in many shapes including, but not limited to, V-shaped riblets, rectangle riblets, shark scale (SS) riblets, and modified shark scale riblets. The various shape riblets, such as the V-shaped riblets and the shark scale riblets are typically an integrated series of groove-like peaks and valleys. In an embodiment, each riblet in the riblet topography has a non-uniform or unequal height. Ranges for the height can be from about 0.001 inches (about 25 µm) up to about 0.20 inches (about 5.0 mm). In an embodiment, each riblet in the riblet topography is spaced evenly a distance apart. In an embodiment, each riblet in the riblet topography is spaced at a non-uniform uneven distance apart. Ranges for the spacing can be from about 0.001 inches (about 25 µm) up to about 0.20 inches (about 5 mm). Typical values for the height and spacing of the riblets are between about 25 µm up to about 2 mm.

The aluminum alloy sheet or plate is passed through the pair of rolls, wherein the rolls are separated a distance apart from each other. As used herein, the term "roll gap" refers to the distance from the unaltered substantially flat outer surface roll to the peak of a riblet on the engraved roll. In an embodiment, ranges for the roll gap can be from about 0.22 inches up to about 0.27 inches. The roll gap has an effect on the reduction of the aluminum alloy sheet or plate, and on the reduction of each of the riblets in the riblet topography of the aluminum alloy product, as will be described in detail below with relation to FIG. 4, FIG. 5, FIG. 6 and FIG. 7. In an embodiment, the rolling reduction can be up to about 10% for an Alclad skin sheet. In an embodiment, the rolling reduction can be up to about 70% for a bare (or unclad) aluminum sheet or plate.

In an embodiment of the present invention, an outer circumferential surface of a roll, for example a steel roll, is engraved with a multiplicity of adjacent longitudinal riblets. This can be accomplished using various methods including, but not limited to, precision machining, laser engraving, knurling, electrical discharge texturing (EDT), shot blasting, 3D X-ray lithography and film masking. For example, in laser engraving, computer-generated patterns are transferred to a laser modulator and the corresponding laser beam pulse train is projected on the roll surface to realize desired projections and indentations of a riblet topography. In an embodiment, the cutting tool used to create the multiplicity of adjacent longitudinal riblets is a Polycrystalline cubic boron nitride (PCBN) material. In an embodiment, the outer circumferential surface of the roll is engraved with a multiplicity of adjacent longitudinal riblets using an electrical discharge texturing machine. In an embodiment, the outer circumferential surface of the roll is engraved with a multiplicity of adjacent longitudinal riblets using a wire electrical discharge texturing machine. By rolling the engraved roll of the present invention on, for example, a cold-rolled or hot-rolled aluminum alloy plate or sheet either in tandem or simultaneously, the same riblet topography will be permanently rolled onto the aluminum alloy plate or sheet.

In an embodiment, the roll having the engraved riblet topography has a diameter between about three inches to about forty inches. In an embodiment, the roll having the engraved riblet topography has a diameter between about ten inches to about forty inches. In an embodiment, the roll having the engraved riblet topography has a diameter of about half an inch. In an embodiment, the roll having the engraved riblet topography has a face length between about five inches to about two-hundred and twenty inches. In an embodiment, the roll having the engraved riblet topography has a face length between about twenty inches to about two-hundred inches. In an embodiment, the roll having the engraved riblet topography has a face length of about half an inch. The rolls that can be used for riblet rolling can have wide range of properties and dimensional ranges. In an embodiment, the roll having the engraved riblet topography has a hardness between about fifty HRC Rockwell Hardness to about eighty HRC Rockwell Hardness. In an embodiment, the roll having the engraved riblet topography has a hardness of about 20 HRC Rockwell Hardness.

In an embodiment, for riblet rolling of an Alclad skin sheet, the rolling speed can range from about ten feet/minute to about five hundred feet/minute. In an embodiment, for riblet rolling of an Alclad skin sheet, the rolling temperature can range from about room temperature to about 300° F. In an embodiment, for riblet rolling of an Alclad skin sheet, a separation force can range from a few thousand pounds to about ten million pounds, depending on the widths and the properties of the Alclad skin sheet core alloys. In an embodiment, for riblet rolling of an Alclad skin sheet, the reduction can range from zero to about ten percent In an embodiment, the roll having the riblet Low plasticity burnishing (LPB) is a surface enhancement technique that uses local cold deformation on the surface to generate compressive residual stresses on and near the surface of metallic components. The riblet rolling process of the present invention also results in cold deformation of the material near the riblet surface, and the amount of cold deformation on the surface varies locally due to the riblet shape. The local variation in deformation during riblet rolling is similar to LPB, and it is believed that this can lead to the generation of compressive residual stresses near the surface. Intentionally induced compressive residual surface stresses, whether introduced by LPB, shot peening or potentially riblet rolling, have been shown to result in significant improvements in crack initiation performance. In an initial series of open hole fatigue tests, two Alclad 2524-T3 sheet materials having two different riblet shapes fabricated according to the methods of the present invention showed that riblets do not significantly decrease fatigue life, and at lower stress levels may even increase the fatigue life. These effects may be attributed to induced compressive stresses resulting from the rolling of the riblet geometries.

FIGS. 1A-D show two embodiments of a riblet topography that were precision machined onto an outer circumferential surface of a roll. In one embodiment (FIG. 1A), an outer circumferential surface of a roll 100 has been engraved with V-shaped grooves 105 having a height of about 125 μm and are spaced a distance apart equal to about 125 μm. In one embodiment (FIG. 1C), an outer circumferential surface of a roll 150 has been engraved with V-shaped grooves 155 having a height of about 50 μm and are spaced a distance apart equal to about 50 μm. FIGS. 1B and 1D are phase-shift images of the corresponding engraved roll surfaces (FIGS. 1A and 1C, respectively) showing the riblet topography.

Figure 2B:
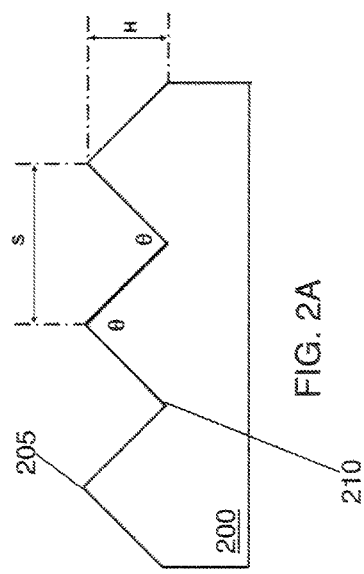
Figure 2C:
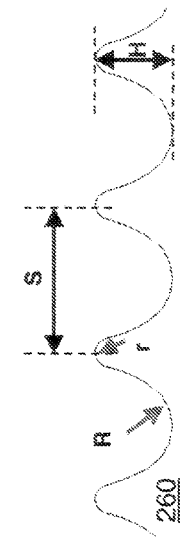
Figure 2D:
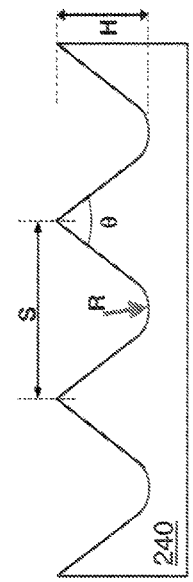

The geometry of the riblets in the riblet topography can be in many shapes including, but not limited to, those depicted in FIGS. 2A-D. FIG. 2A shows V-shaped riblets 200 (also known as saw-tooth riblets), FIG. 2B shows rectangle riblets 220, FIG. 2C shows shark scale riblets 240, and FIG. 2D shows modified shark scale riblets 260. As illustrated in FIG. 2A, the V-shaped cross-sections 200 are typically an integrated series of groove-like peaks 205 and valleys 210. FIG. 3 is a table listing various parameters (spacing, height, radius R, radius r, and angle) of the riblet geometries illustrated in FIGS. 2A-D.

Figure 4F:
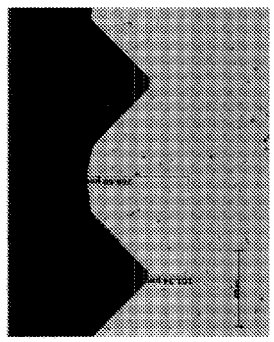
FIGS. 4A-H show cross-sectional optical metallography images of riblet topographies obtained on aluminum Alclad alloy sheets of 0.270" gage, illustrating an embodiment, by passing the aluminum alloy sheet through a rolling mill at different percentage reduction, where A represents the highest reduction and H the lowest reduction, that includes at least one roll having an outer surface engraved with a "V" riblet topography, wherein the riblet topography on the roll includes a multiplicity of adjacent longitudinal riblets having a height of approximately 250 µm and spaced a distance apart of approximately 500 µm.
Figure 4G:
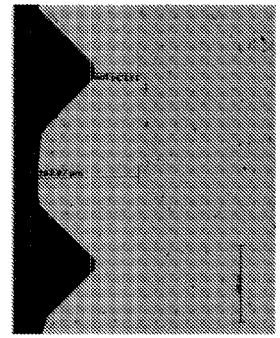
Figure 4H:
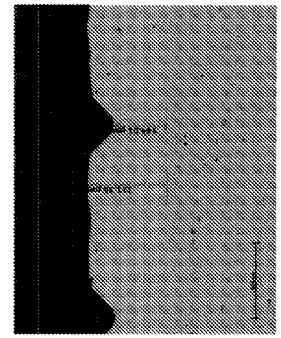
Figure 4D:
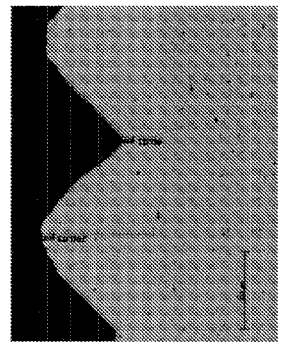
Figure 4E:
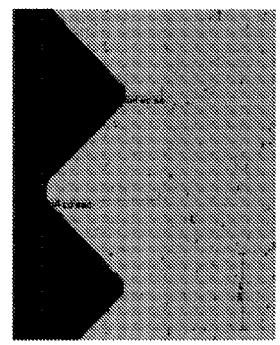
Figure 4A:
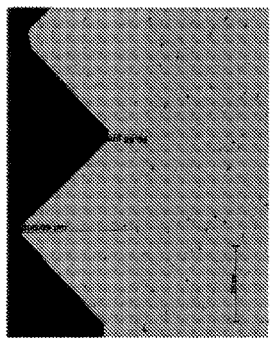
Figure 4B:
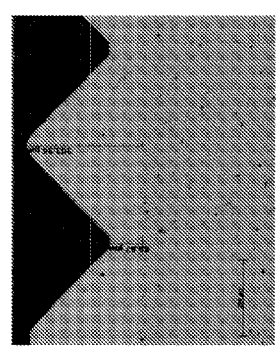
Figure 4C:
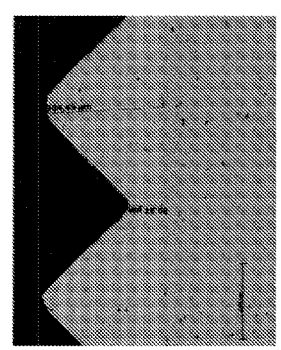

FIGS. 4A-H show cross-sectional optical metallography images of riblet topographies obtained on aluminum Alclad alloy sheets of 0.270" gage by passing the aluminum alloy sheet through a rolling mill that includes at least one roll having an outer surface engraved with a deep "V" riblet topography, wherein the riblet topography on the roll includes a multiplicity of adjacent longitudinal riblets having a height of approximately 250 μm and spaced a distance apart of approximately 500 μm, illustrating an embodiment of the present invention. FIG. 4A shows the riblet topography obtained using a rolling mill having a roll gap of approximately 0.221 inches. FIG. 4B shows the riblet topography obtained using a rolling mill having a roll gap of approximately 0.230 inches. FIG. 4C shows the riblet topography obtained using a rolling mill having a roll gap of approximately 0.241 inches. FIG. 4D shows the riblet topography obtained using a rolling mill having a roll gap of approximately 0.249 inches. FIG. 4E shows the riblet topography obtained using a rolling mill having a roll gap of approximately 0.251 inches. FIG. 4F shows the riblet topography obtained using a rolling mill having a roll gap of approximately 0.257 inches. FIG. 4G shows the riblet topography obtained using a rolling mill having a roll gap of approximately 0.260 inches. FIG. 4H shows the riblet topography obtained using a rolling mill having a roll gap of approximately 0.264 inches.

Figure 5:
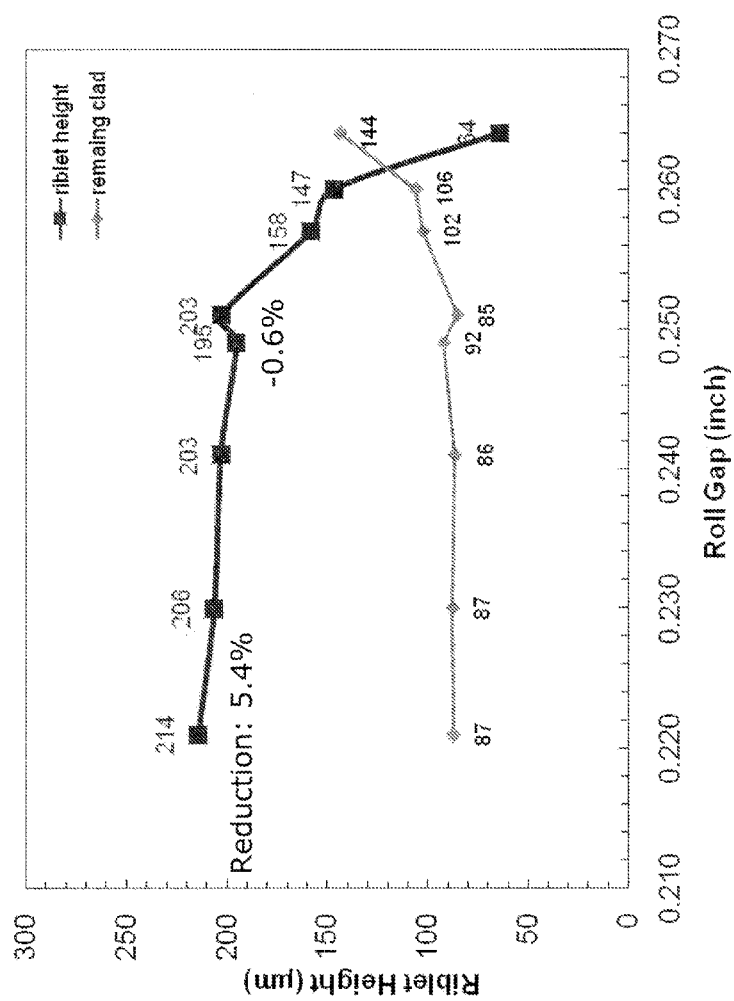
FIG. 5 is a graph illustrating the relationship between the roll gap (inches) of the rolling mill, the height (µm) of the riblets on the aluminum alloy sheet after rolling, the remaining clad (inches) on the aluminum alloy sheet after rolling, and the reduction (%) in gauge of the aluminum alloy sheet after rolling, based on the samples of FIGS. 4A-H.

FIG. 5 is a graph illustrating the relationship between the roll gap (inches) of the rolling mill, the height (μm) of the riblets on the aluminum Alclad alloy sheet of 0.270" gage after rolling, the remaining clad (inches) on the aluminum alloy sheet after rolling, and the reduction (%) in gauge of the aluminum alloy sheet after rolling, based on the samples of FIGS. 4A-H.

Figure 7:
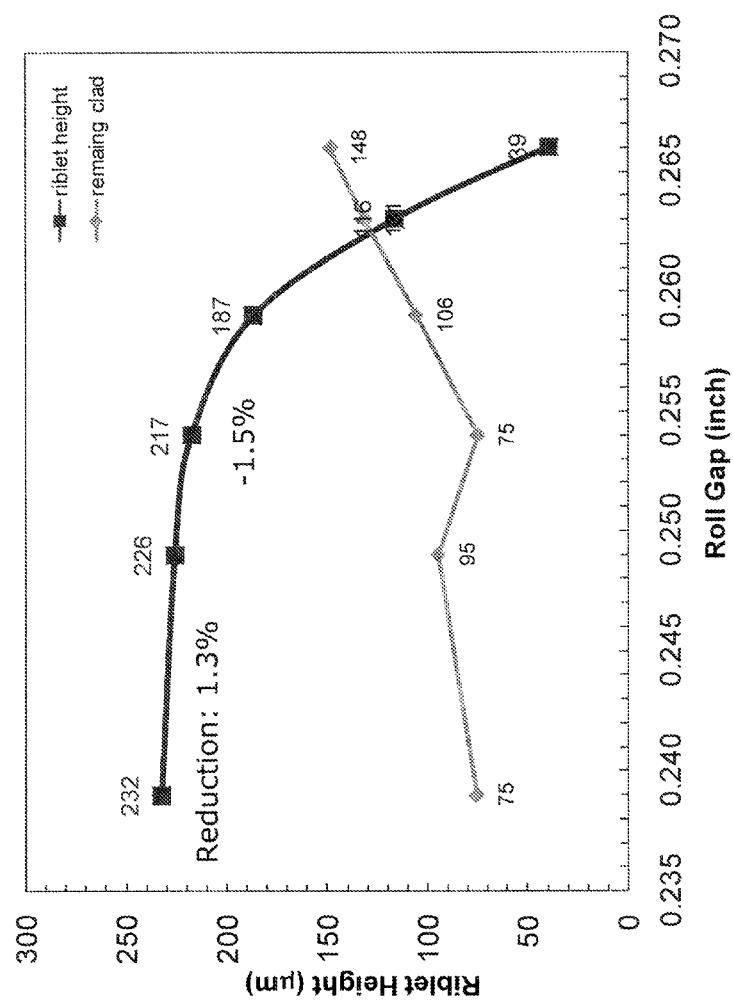
FIG. 7 is a graph illustrating the relationship between the roll gap (inches) of the rolling mill, the height (μm) of the riblets on the aluminum alloy sheet after rolling, the remaining clad (inches) on the aluminum alloy sheet after rolling, and the reduction (%) in gauge of the aluminum alloy sheet after rolling, based on the samples of FIGS. 6A-F.

FIGS. 6A-F show cross-sectional optical metallography images of riblet topographies obtained on aluminum Alclad alloy sheets of 0.270" gage by passing the aluminum alloy sheet through a rolling mill that includes at least one roll having an outer surface engraved with a shark scale (SS) riblet topography, wherein the riblet topography on the roll includes a multiplicity of adjacent longitudinal riblets having a height of approximately 260 μm and spaced a distance apart of approximately 500 μm, illustrating an embodiment of the present invention. FIG. 6A shows the riblet topography obtained using a rolling mill having a roll gap of approximately 0.239 inches. FIG. 6B shows the riblet topography obtained using a rolling mill having a roll gap of approximately 0.249 inches. FIG. 6C shows the riblet topography obtained using a rolling mill having a roll gap of approximately 0.254 inches. FIG. 6D shows the riblet topography obtained using a rolling mill having a roll gap of approximately 0.259 inches. FIG. 6E shows the riblet topography obtained using a rolling mill having a roll gap of approximately 0.263 inches. FIG. 6F shows the riblet topography obtained using a rolling mill having a roll gap of approximately 0.266 inches FIG. 7 is a graph illustrating the relationship between the roll gap (inches) of the rolling mill, the height (μm) of the riblets on the aluminum Alclad alloy sheet of 0.270" gage after rolling, the remaining clad (inches) on the aluminum alloy sheet after rolling, and the reduction (%) in gauge of the aluminum alloy sheet after rolling, based on the samples of FIGS. 6A-F.

Although the metal sheets and plates disclosed herein are mainly described with relation to the commercial aircraft industry, the methods, processes, and products described in this invention can be used with relation to military aircrafts, supersonic aircrafts, space aircrafts, ground vehicles such as trucks and automobiles, trains, high speed trains, marine ships and vessels, as well as wind turbine applications.

In an embodiment, the metal sheets and plates disclosed herein are an integrated part of the structure of aircrafts, ground vehicles, trains, marine ships and vessels, wind turbines, and pipelines rather than adhesively bonding riblet films to the structural surfaces of the aircrafts, ground vehicles, trains, marine ships and vessels, wind turbines, and pipelines.

In an embodiment, the manufacturing flow paths for riblet rolling are cold rolling at the end of the manufacturing processes due to flatness, surface quality, and handling damage considerations. As an example, for riblet rolling of an Alclad skin sheet, as shown in the manufacturing flow paths of FIGS. 8 and 9, the cold rolling speed can range from about ten feet/minute to about five-hundred feet/minute, the rolling temperature can range from about room temperature to about 300° F., with separation force ranging from a few thousand pounds to about ten million pounds depending on the widths and the properties of the Alclad skin sheet core alloys. In an embodiment, the cold rolling reduction for rolling riblets on Alclad skin sheet ranges from about zero percent to about ten percent.

Figure 8:
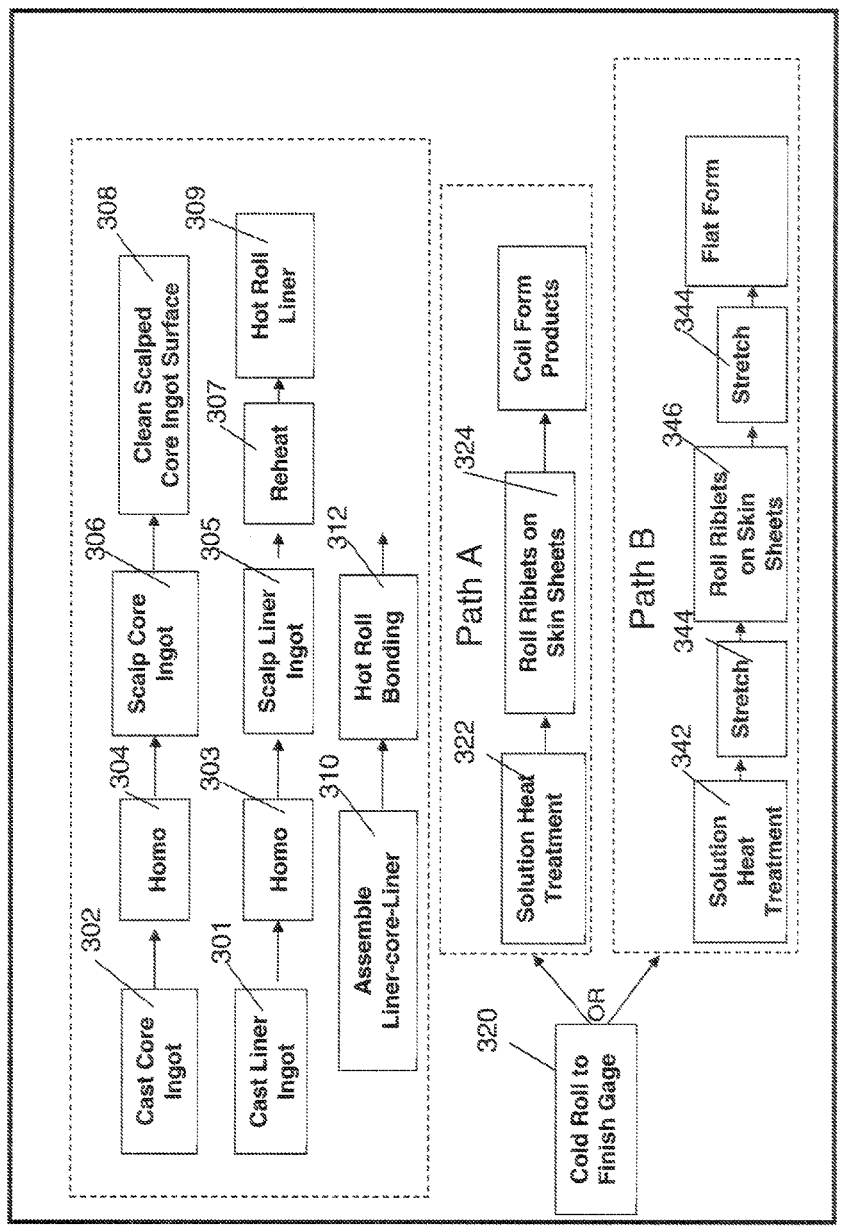
FIG. 8 shows an embodiment of a flow path for manufacturing a fuselage aluminum alloy skin sheet having a substantially grooved surface formed from a riblet topography of the present invention.

Method for Manufacturing an Aluminum Alloy Product Having a Friction-Reducing Textured Surface from a Heat-Treatable Alclad Structure FIG. 8 shows an embodiment of a flow path for manufacturing an aluminum alloy product having at least one surface that is substantially grooved resulting in a friction-reducing textured surface. In an embodiment, the aluminum alloy product is a fuselage skin sheet. In the embodiment depicted in FIG. 8, the resulting fuselage skin sheet is manufactured from a heat-treatable Alclad structure that has been fabricated by Alcladding. As the practice of Alcladding is performed today, a cast core ingot of alloyed aluminum is covered on one or both faces with a cast liner ingot of higher purity aluminum, or an aluminum alloy. As outlined in FIG. 8, a core ingot 302 and a pair of liner ingots 301 are homogenized ("Homo") 304 and 303, respectively. In an embodiment, homogenization can be carried out by heating to a metal temperature in the range of about 900° or about 910° or about 920° F., to about 945° or about 950° or about 960° F. or, possibly as much as about 1050° F., for a period of time, typically at least about 1 hour up to about 8 hours or more, to dissolve soluble elements and to homogenize the internal structure of the metal. A suitable time period is about 4 hours or more in the homogenization temperature range. In an embodiment, homogenization is an optional step. Following homogenization, the core ingot 302 and the liner ingots 301 are "scalped" 306 and 307, respectively, to remove any surface defects. Once the surface defects have been removed, the cast liner ingots 301 are reheated 307. The reheat can ensure that the components of the alloy are properly distributed throughout the metallurgical structure. The reheat also gets the metal to a suitable temperature for hot rolling 309. The scalped core ingot is cleaned 308. A liner and core sandwich is then assembled 310. The liner and core sandwich which communicate with one another is preheated and subsequently hot rolled 312 making a slab or integral Alclad structure. The core material provides the strength and desired material properties required in the fuselage skin sheet product and the liner provides the corrosion resistance. It should be noted that some of the steps can be removed, while still other steps can be added, and still fall within the scope and spirit of the invention.

After the Alclad structure has been hot rolled 312, the method continues to one of path A or path B via step 320, depending on whether the resulting fuselage skin sheet is in the format of a coil or a flat sheet, respectively. In path A, the heat-treatable Alclad structure is solution heat treated 322 and cold rolled 324 using a rolling mill that includes at least one roll having the roll surface that has been engraved with a multiplicity of adjacent longitudinal riblets, as described above. When the Alclad structure is passed through the roll having the engraved multiplicity of adjacent longitudinal riblets, a surface of the Alclad structure becomes permanently rolled with a multiplicity of adjacent longitudinal riblets. The resulting fuselage skin sheet includes a friction-reducing textured surface. The fuselage skin sheet is then coiled. Alternatively, as shown in path B, the heat-treatable Alclad structure is stretched prior to and after being cold rolled and permanently rolled to remove any internal stresses, to flatten the skin sheet, and/or to improve the mechanical properties of the resulting fuselage skin sheet. The fuselage skin sheet (wide width sheet) is then formed into a flat roll sheet or plate.

Figure 9:
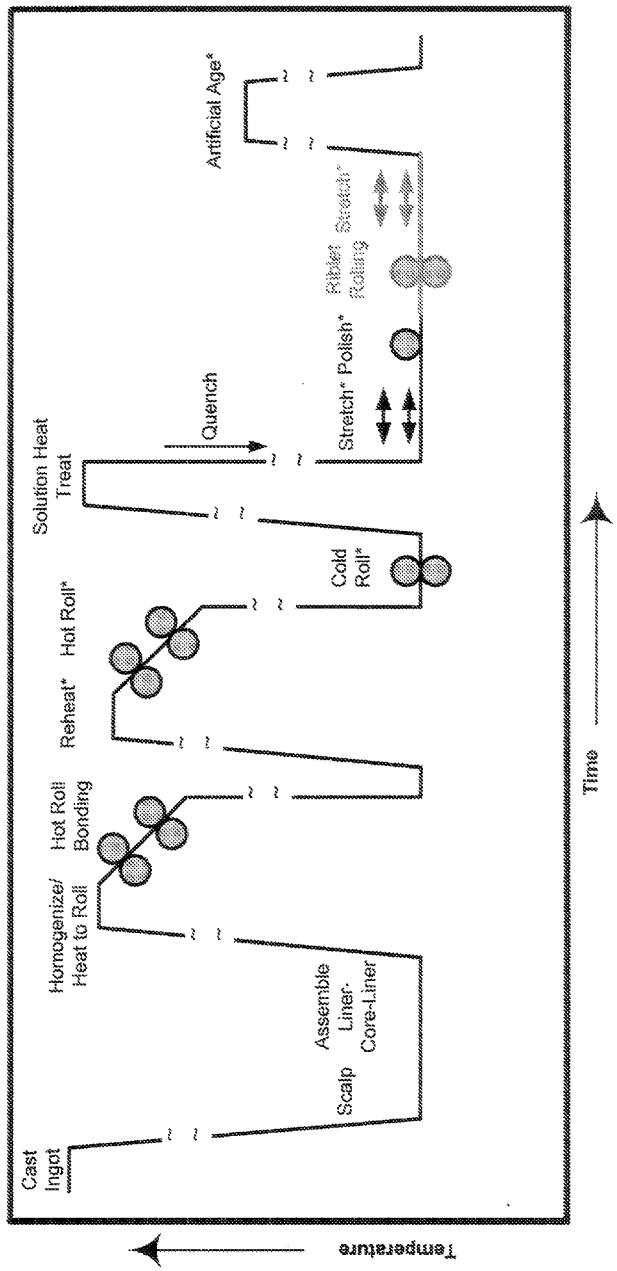
FIG. 9 shows an embodiment of a temperature versus time schematic for manufacturing a fuselage aluminum alloy skin sheet having a substantially grooved surface formed from a riblet topography of the present invention.

FIG. 9 shows a temperature versus time schematic of an embodiment of a flow path for manufacturing a fuselage skin sheet having at least one surface that is substantially grooved resulting in a friction-reducing textured surface. In the embodiment depicted in FIG. 9, the resulting fuselage skin sheet is manufactured from a heat-treatable Alclad structure that has been fabricated by Alcladding. As outlined in FIG. 9, an ingot is cast, scalped, and assembled to create a liner-core-liner sandwich. After casting, an optional stress relief step can be performed. After the liner-core-liner sandwich is assembled, the assembly is homogenized, where the homogenization step serves as a heat to roll step. In an embodiment, the homogenization can be carried out by heating to a metal temperature in the range of about 900° or about 910° or about 920° F., to about 945° or about 950° or about 960° F. or, possibly as much as about 1000° F., for a period of time, typically at least about 1 hour up to about 8 hours or more, to dissolve soluble elements and to homogenize the internal structure of the metal. A suitable time period is about 4 hours or more in the homogenization temperature range. In an embodiment, homogenization is not performed, and the alloy is only given a heat to roll step. In some embodiments, after hot rolling, there is a reheat and second hot rolling step. The optional steps are marked with an asterisk in FIG. 9. In an embodiment, the core material provides the strength and damage tolerance required in the fuselage skin sheet product and the liner provides the corrosion resistance. It should be noted that some of the steps can be removed, while still other steps can be added, and still fall within the scope and spirit of the invention.

After the Alclad assembly has been hot rolled, the assembly is either cold rolled or hot rolled to a final thickness. The heat-treatable Alclad structure is solution heat treated and stretched prior to and after being cold rolled and permanently rolled to remove any internal stresses or to improve the mechanical properties of the resulting fuselage skin sheet. The fuselage skin sheet (wide width sheet) is formed into a flat roll sheet or plate. An optional artificial aging step can be employed in the flow path, especially for an aluminum alloy T6, T7 or T8 type product.

Figure 10:
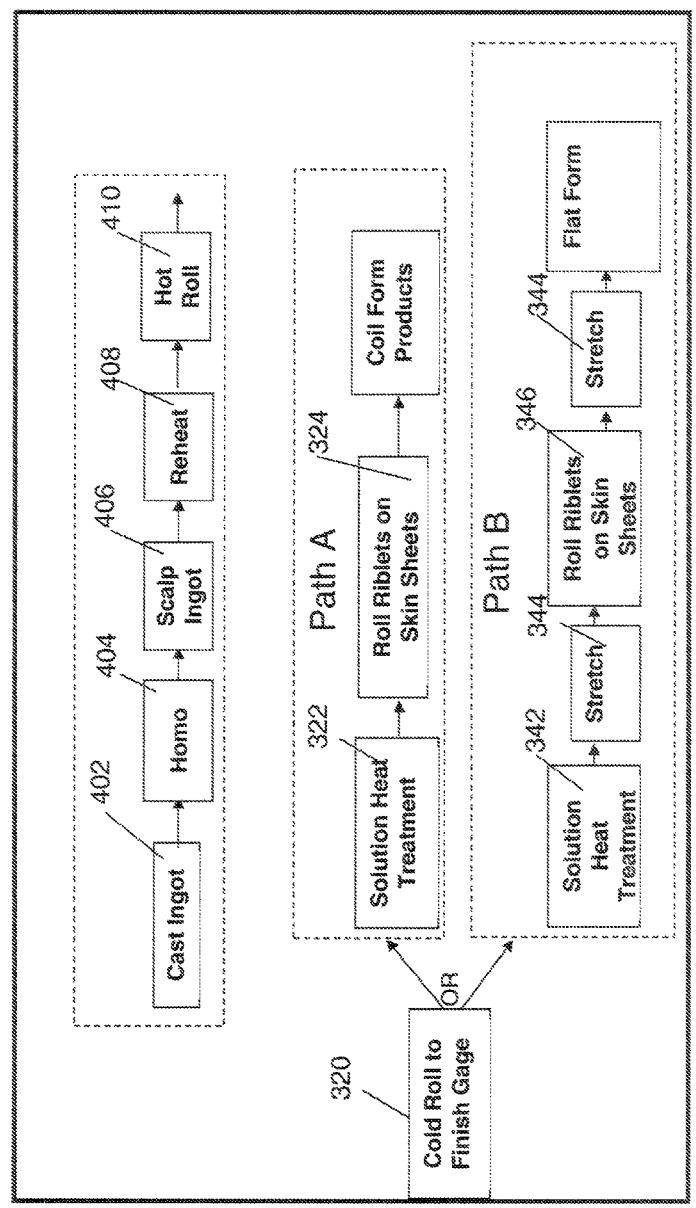
FIG. 10 shows an embodiment of a flow path for manufacturing a fuselage aluminum alloy skin sheet having a substantially grooved surface formed from a riblet topography of the present invention.
Figure 11:
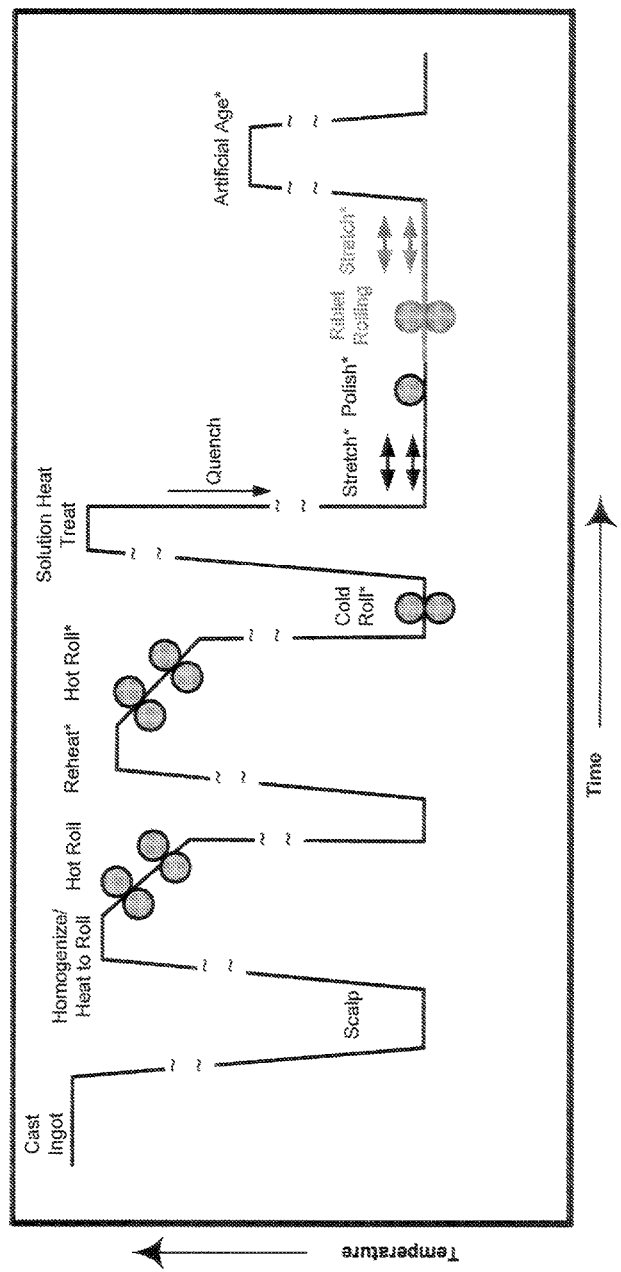
FIG. 11 shows an embodiment of a temperature versus time schematic for manufacturing a fuselage aluminum alloy skin sheet having a substantially grooved surface formed from a riblet topography of the present invention. The riblets were rolled after a solution heat treatment step.
Figure 12:
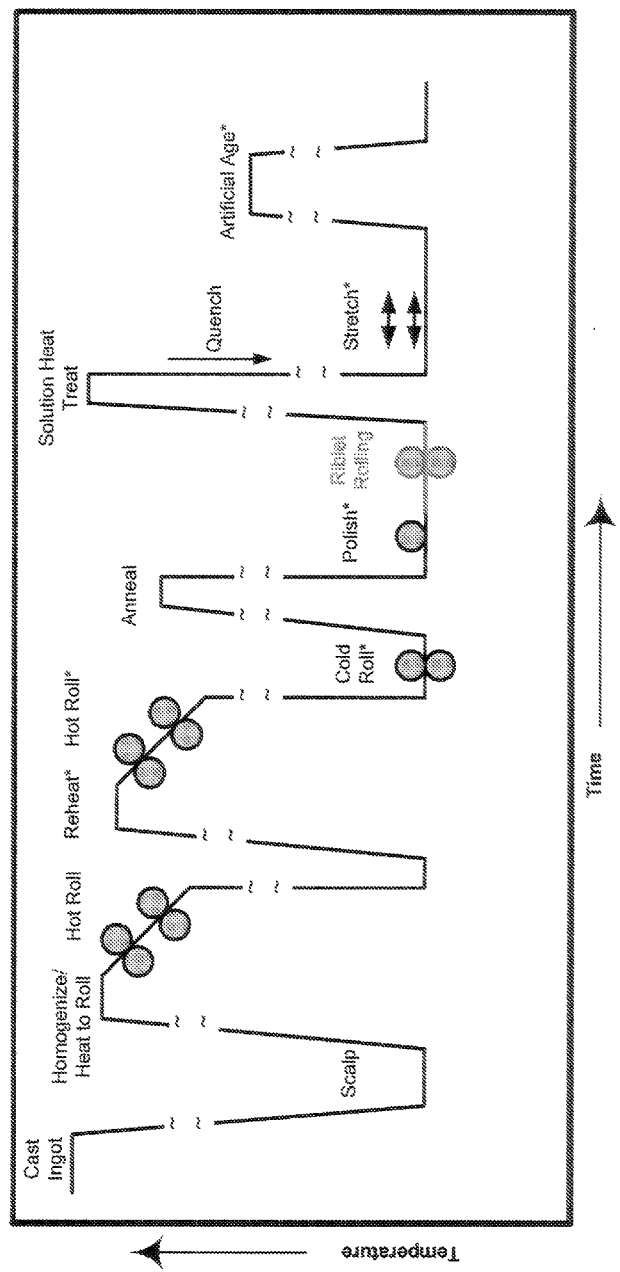
FIG. 12 shows an embodiment of a temperature versus time schematic for manufacturing a fuselage aluminum alloy skin sheet having a substantially grooved surface formed from a riblet topography of the present invention. The riblets were rolled after an annealing step but prior to a solution heat treatment step.

Method for Manufacturing an Aluminum Alloy Product Having a Friction-Reducing Textured Surface from a Heat-Treatable Non-Clad Material The embodiments described with relation to FIGS. 10-12 are similar to that described and shown in FIGS. 8 and 9, the difference being that a heat-treatable bare (non-clad) aluminum alloy structure is used. In an embodiment, the heat-treatable bare aluminum alloy structure is an Al—Li structure. As outlined in FIG. 10, a cast ingot 402 is homogenized 404, scalped 406, reheated 408 and hot rolled 410. After the aluminum alloy structure has been hot rolled 410, the method continues to one of path A or path B, which is identical to that described above for FIG. 8. FIGS. 11 and 12 illustrate temperature versus time schematics of various embodiment of a flow path for manufacturing a fuselage skin sheet having at least one surface that is substantially grooved resulting in a friction-reducing textured surface. In the embodiment depicted in FIG. 11, the resulting fuselage skin sheet is manufactured from a heat-treatable bare structure, and the riblet rolling step occurs after a solution heat treatment step. As illustrated in FIG. 11, after casting an ingot, the processing includes a stress relieve step (optional), a scalping step, a homogenize step, which serves as the heat to roll step, then a hot roll step. There would also typically be a reheat and a second hot roll step, but this is optional. After the structure has been hot rolled, the structure is either cold rolled or hot rolled to a final thickness. The heat-treatable bare structure is solution heat treated and stretched prior to and after being cold rolled and permanently rolled to remove any internal stresses, flatten, and/or to improve the mechanical properties of the resulting fuselage skin sheet. The fuselage skin sheet (wide width sheet) is formed into a flat roll sheet or plate. An optional artificial aging step can be employed in the flow path for a T6, T7 or T8 type product.

There may be difficulty with the riblet rolling after solution heat treatment if there is significant natural aging taking place and the material becomes too strong to roll the riblets. Another processing option is to anneal the sheet and roll the riblets prior to solution heat treatment. The processing for bare heat-treatable sheet given in FIG. 12 is for the case where the riblet rolling is conducted before the solution heat treatment step. The practice prior to cold rolling is the same as described above for FIG. 11. The processing can include one or more annealing and cold rolling operations (optional) followed by annealing and then riblet rolling. The sheet can then be processed by either Path A or Path B in FIG. 10. For Path A there would be no riblet rolling step and for Path B there would be no riblet rolling or second stretching operation.

Figure 13:
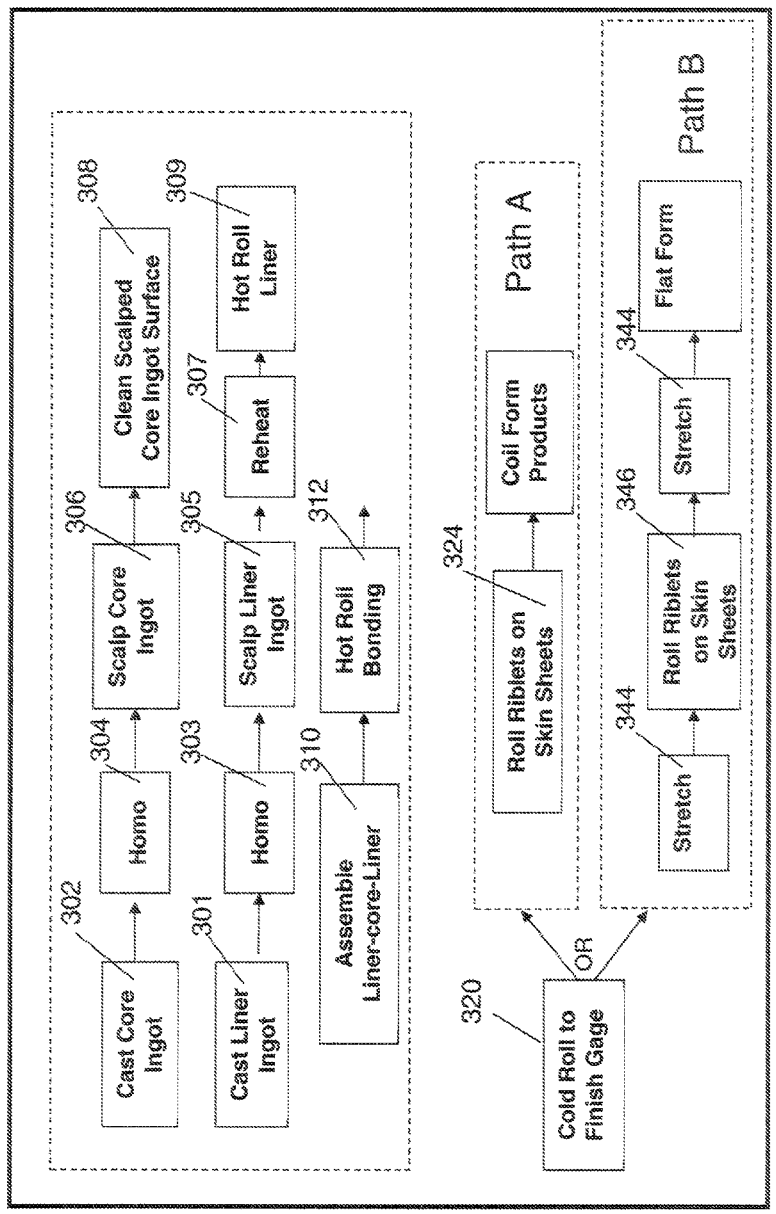
FIG. 13 shows an embodiment of a flow path for manufacturing an aluminum alloy skin sheet or plate having a substantially grooved surface formed from a riblet topography of the present invention.

Method for Manufacturing an Aluminum Alloy Product Having a Friction-Reducing Textured Surface from a Non-Heat-Treatable Alclad Structure FIG. 13 shows an embodiment of the flow path for manufacturing an aluminum alloy product having at least one surface that is substantially grooved resulting in a friction-reducing textured surface. In an embodiment, the aluminum alloy product is a fuselage skin sheet. The skin sheet has use, for example, in hydro-applications. In the embodiment depicted in FIG. 13, the resulting skin sheet is manufactured from a non-heat-treatable Alclad structure that has been fabricated by Alcladding, as was previously described above for FIG. 8. The method then continues to one of path A or path B, depending on whether the skin sheet is to be coiled or formed into a flat sheet/plate, respectively. The difference between path A and B from FIG. 13, and that described in FIGS. 8 and 10, is that since a non-heat-treatable Alclad structure is being used, the step of solution heat treating is removed, otherwise the remaining steps are equivalent to that described above for FIGS. 8 and 10.

Figure 14:
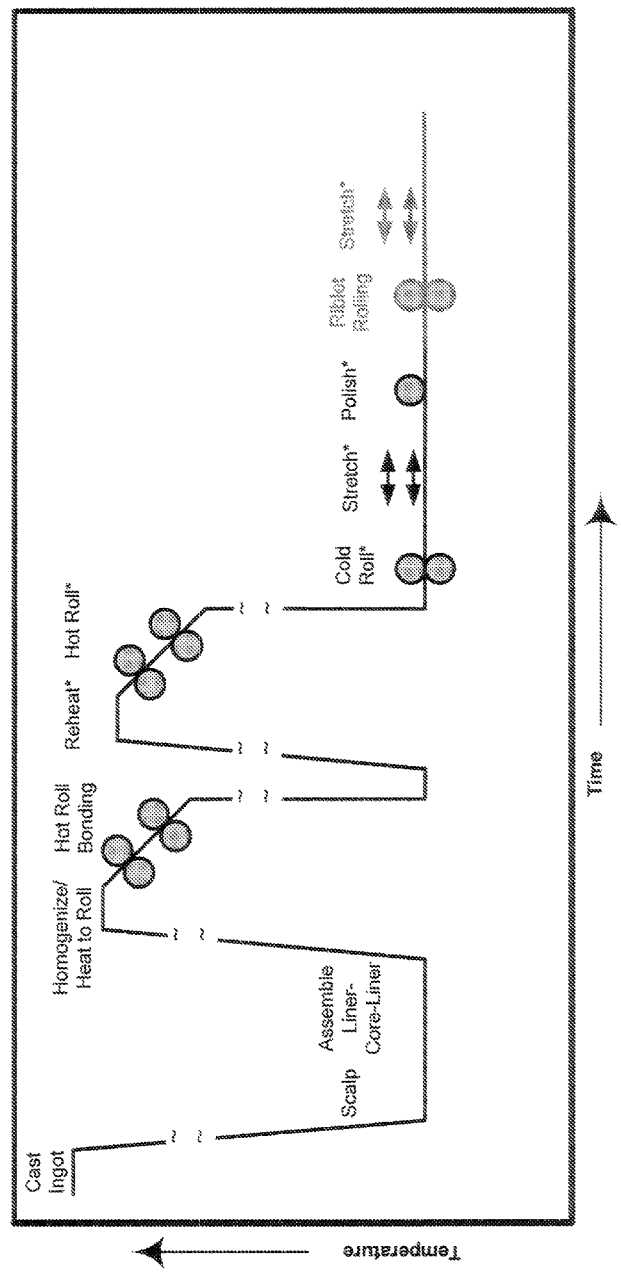
FIG. 14 shows an embodiment of a temperature versus time schematic for manufacturing a fuselage aluminum alloy skin sheet having a substantially grooved surface formed from a riblet topography of the present invention.

FIG. 14 shows a temperature versus time schematic of an embodiment of a flow path for manufacturing a fuselage skin sheet having at least one surface that is substantially grooved resulting in a friction-reducing textured surface. In the embodiment depicted in FIG. 14, the resulting fuselage skin sheet is manufactured from a non-heat-treatable Alclad structure that has been fabricated by Alcladding. As outlined in FIG. 14, an ingot is cast, scalped, and assembled to create a liner-core-liner sandwich. After casting, an optional stress relief step can be performed. After the liner-core-liner sandwich is assembled, the assembly is homogenized, where the homogenization step serves as a heat to roll step, then hot rolled. In an embodiment, the homogenization can be carried out by heating to a metal temperature in the range of about 900° or about 910° or about 920° F., to about 945° or about 950° or about 960° F. or, possibly as much as about 1000° F., for a period of time, typically at least about 1 hour up to about 8 hours or more, to dissolve soluble elements and to homogenize the internal structure of the metal. A suitable time period is about 4 hours or more in the homogenization temperature range. In an embodiment, the homogenization step is not performed, and the alloy is only given a heat to roll step. In some embodiments, after hot rolling, there is a reheat and second hot rolling step. The optional steps are marked with an asterisk in FIG. 14. In an embodiment, the core material provides the strength and mechanical properties required in the fuselage skin sheet product and the liner provides the corrosion resistance. It should be noted that some of the steps can be removed, while still other steps can be added, and still fall within the scope and spirit of the invention.

In an embodiment, after the Alclad assembly has been hot rolled, the assembly is cold rolled to a final thickness. The non-heat-treatable Alclad structure is stretched prior to and after riblet rolling. The stretching removes any internal stresses, flattens the sheet, and/or improves the mechanical properties of the resulting fuselage skin sheet. The fuselage skin sheet (wide width sheet) is formed into a flat roll sheet or plate.

Figure 15:
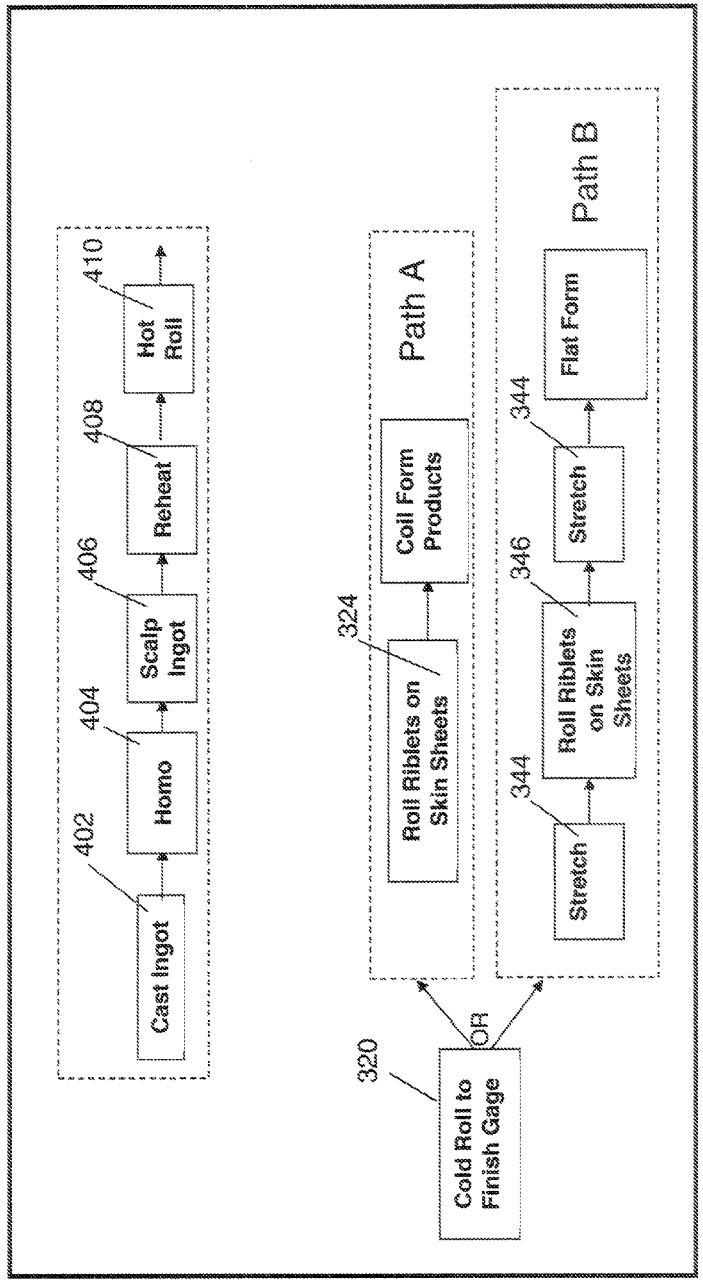
FIG. 15 shows an embodiment of a flow path for manufacturing an aluminum alloy skin sheet or plate having a substantially grooved surface formed from a riblet topography of the present invention.

Method of Manufacturing an Aluminum Alloy Having a Friction-Reducing Textured Surface from a Non-Heat-Treatable Non-Clad Structure FIG. 15 shows an embodiment of the flow path for manufacturing an aluminum alloy product having at least one surface that is substantially grooved resulting in a friction-reducing textured surface. In an embodiment, the aluminum alloy product is a fuselage skin sheet. In the embodiment depicted in FIG. 15, the resulting skin sheet is manufactured from a non-heat-treatable bare (non-Alclad) structure, as was previously described above for FIGS. 10-12. The method then continues to one of path A or path B, as described above for FIG. 13.

Figure 16:
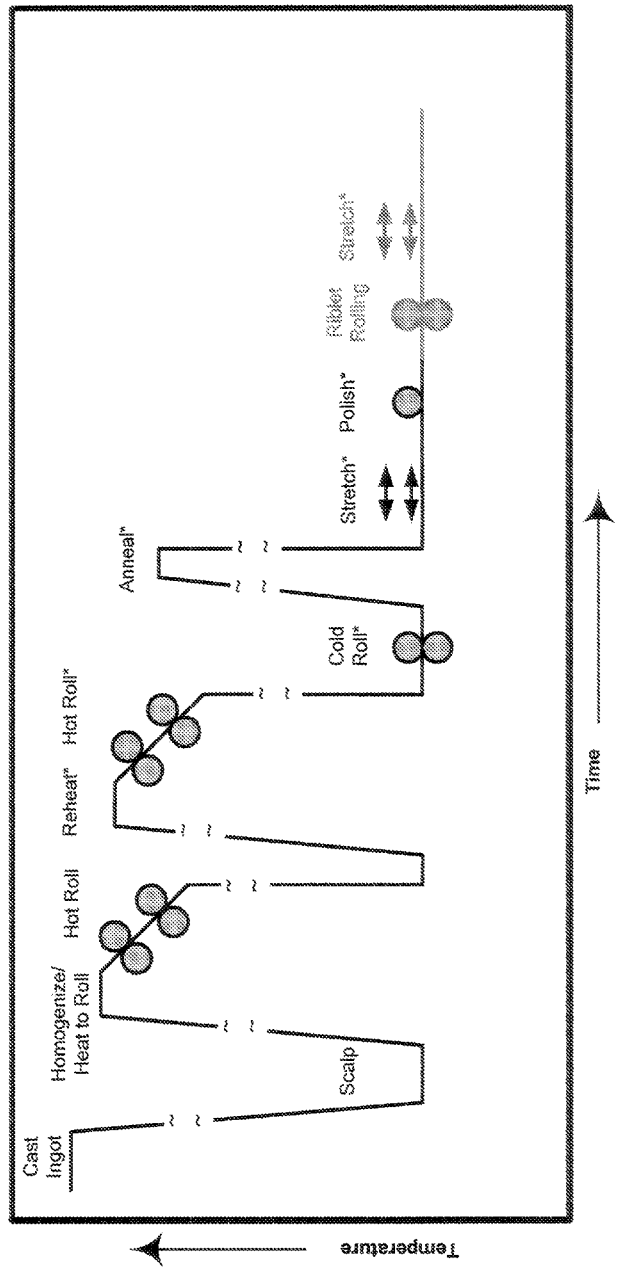
FIG. 16 shows an embodiment of a temperature versus time schematic for manufacturing a fuselage aluminum alloy skin sheet having a substantially grooved surface formed from a riblet topography of the present invention.

FIG. 16 illustrates a temperature versus time schematic of a flow path for manufacturing a fuselage skin sheet having at least one surface that is substantially grooved resulting in a friction-reducing textured surface. In the embodiment depicted in FIG. 16, the resulting fuselage skin sheet is manufactured from a non-heat-treatable bare structure, and the riblet rolling step occurs after an optional annealing step. As illustrated in FIG. 16, after casting an ingot, the processing includes a stress relieve step (optional), a scalping step, a homogenize step, which serves as the heat to roll step, then a hot roll step. After the assembly has been hot rolled, there can be one or more annealing and cold rolling operations, which are optional. The assembly is stretched prior to and after riblet rolling. The stretching removes any internal stresses, flattens, and/or improves the mechanical properties of the resulting fuselage skin sheet. The fuselage skin sheet (wide width sheet) is formed into a flat roll sheet or plate.

Figure 17:
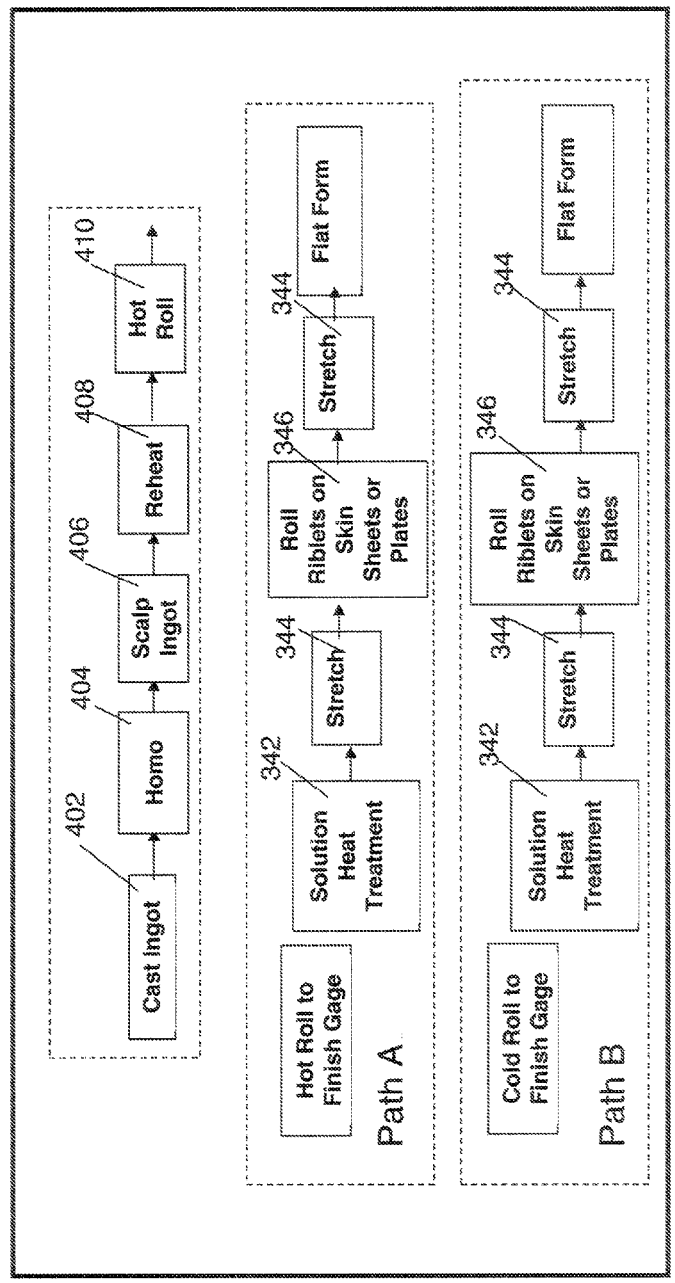
FIG. 17 shows an embodiment of a flow path for manufacturing an aluminum alloy wing skin sheet or plate having a substantially grooved surface formed from a riblet topography of the present invention.

Method of Manufacturing an Aluminum Alloy Product Having a Friction-Reducing Textured Surface from a Heat-Treatable Non-Clad Material FIG. 17 shows an embodiment of a flow path for manufacturing an aluminum alloy product having at least one surface that is substantially grooved resulting in a friction-reducing textured surface. In an embodiment, the aluminum alloy product is a wing skin sheet. In the embodiment depicted in FIG. 17, the resulting wing skin sheet is manufactured from a heat-treatable bare (non-Alclad) structure, that has been fabricated as described in FIG. 10. The method then continues to one of path A or path B, depending on whether the heat-treatable bare structure is to be hot-rolled or cold-rolled, respectively. In path A the heat-treatable bare structure is solution heat treated, stretched and rolled using a rolling mill that includes one or more roll stands each having two or more rolls. An entire circumferential surface of at least one of the rolls includes a multiplicity of adjacent precision machined longitudinal riblets. When the heat-treatable bare structure is passed through the rolls, the multiplicity of adjacent precision machined longitudinal riblets are pressed into the heat-treatable bare structure, forming a multiplicity of adjacent permanently rolled longitudinal riblets. The longitudinal riblets run in a streamline pattern along at least part of a surface of the heat-treatable bare structure, resulting in a wing skin sheet with drag-reducing properties. Alternately, in path B, the heat-treatable bare structure is solution heat treated and rolled using a rolling mill that includes one or more roll stands each having two or more rolls. An entire circumferential surface of at least one of the rolls includes a multiplicity of adjacent precision machined longitudinal riblets. When the heat-treatable bare structure is passed through the rolls, the multiplicity of adjacent precision machined longitudinal riblets are pressed into the heat-treatable bare structure, forming a multiplicity of adjacent permanently rolled longitudinal riblets. It should be noted that for paths A and B, the riblet rolling can occur prior to solution heat treatment.

The embodiments disclosed herein describe cold rolling manufacturing flow paths for riblet rolling. However, it should be noted that the present invention also relates to riblet rolling onto metal sheets or plates during hot rolling processes, especially for hard alloys and metals that have high yield strengths at room temperature. In an embodiment, for rolling riblets during hot rolling, the hardness of the rolls can be typical for hot rolling hardness, and can range from about forty to about seventy HRC Rockwell Hardness. The size of the rolls can be typical for hot rolling with roll diameter ranging from about twenty inches to about forty inches, and the widths can range from about twenty inches to about two-hundred and twenty inches. The rolling speed can range from about ten feet/minute to about four-hundred feet/minute, while rolling temperature range from about 650° F. to about 975° F., with separation force ranging from about one to about ten million pounds depending on alloy, widths, and reduction. The reduction can range from about zero percent to about seventy percent.

Figure 18B:
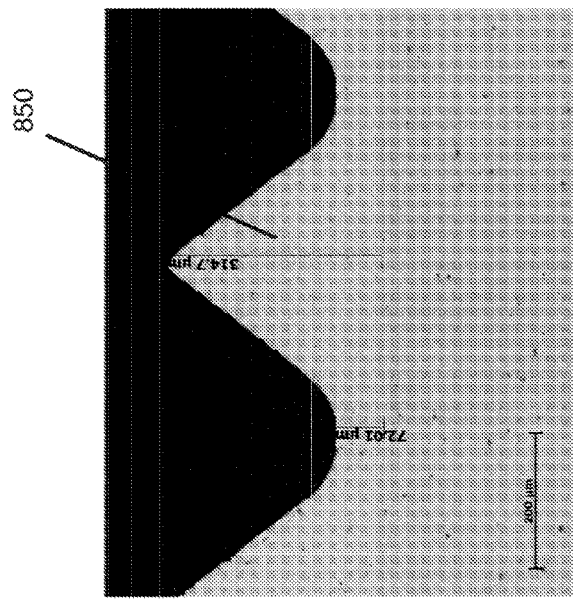
FIGS. 18A-B show cross-sectional optical metallography images of two different riblet patterns that were permanently rolled on an Alclad aluminum alloy sheet using methods of the present invention.
Figure 18A:

FIGS. 18A and 18B show two embodiments of a riblet topography permanently rolled onto an Alclad aluminum alloy structure using the methods of the invention to fabricate an aluminum alloy product of the present invention. FIG. 18A shows a cross-sectional view of V-shaped riblets 800. FIG. 18B shows a cross-sectional view of shark-scale riblets 850. As visible in both embodiments, the riblets have a substantially smooth surface.

In order to prevent or minimize corrosion and to provide decorative and appealing appearance to an aircraft, the airframe and outer skin are usually provided with a protective coating that is usually applied in one or more layers. In the case of multi-layer coatings, a first base foundation coat can be an anti-corrosion wash-primer layer, a second intermediate primer can be an enhancer to adhere and bind to the metal such as aluminum or its alloys, followed by other layer(s) applied over the primer layer. These layer(s) may include colored pigments to produce decorative and appearance effects, such as the airline colors and gloss appearance. Typically, these multi-layer coatings are applied to a smooth, flat, metal surface, and therefore little thought is given to maintaining the topography of the flat surface. Typically it is desirable to have the paint coatings fill up and level the surface wishing to be covered.

In an embodiment, the metal sheets and plates disclosed herein are used in the fabrication of an aircraft. If it is desired that the aircraft having the metal sheets and plates be coated with at least one paint layer, careful attention to the entire painting process is necessary. In order for the metal sheets and plates to maintain their friction-reducing textured surface, it is critical that the riblet topography be largely maintained throughout the various manufacturing steps such as cleaning, pretreatment and painting processes. With regard to topography retention, the goal is to keep the paint from completely filling in the topography. By carefully controlling the rheology, viscosity, and flow pattern of the paint, as well as the painting system used, riblet topography can be maintained.

The painting methods disclosed herein preserve as much of the surface topography telegraph through the paint layers as possible. In applying paint systems to the surface, a number of variables define the painting operation, including, but not limited to: paint type (tradename/chemistry), paint application method (manual or robotic), paint delivery method (for delivery to the spray gun), spray gun type, spray gun orifice sizes, paint viscosity, type and amount of reduction solvent, amount of fluid delivered to spray gun (number of turns on fluid control knob), air pressure for painting, number of spray passes, and paint cure condition.

Figure 19:
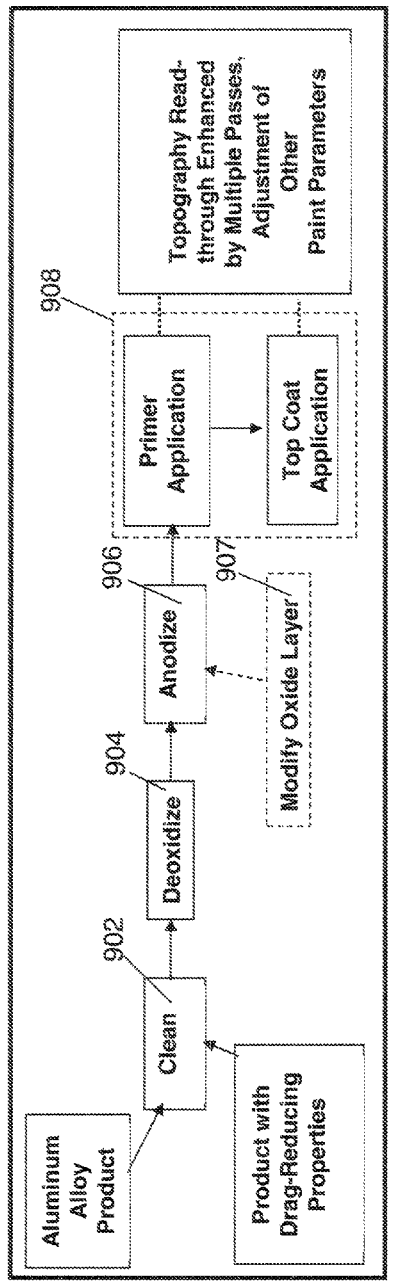
FIG. 19 shows an embodiment of a flow path for the surface preparation and painting of an aluminum alloy sheet or plate having a riblet topography to create an aluminum alloy of the present invention.

The metal sheets and plates disclosed herein can be painted, while still maintaining their friction-reducing textured surface properties. As illustrated in the embodiment depicted in FIG. 19, an aluminum alloy product having a riblet topography as disclosed herein is surface prepared by cleaning 902, deoxidizing 904, and anodizing 906 prior to painting 908 (shown in FIG. 19 as a primer application and a topcoat application). In an embodiment, a metal sheet and plate having a riblet topography is manufactured as disclosed in one of the flow paths of FIGS. 8-17, and is then painted using the techniques of the present invention to preserve the riblet topography. In an embodiment, a metal sheet and plate having a riblet topography is manufactured in, for example, an OEM facility using other methods, and is then painted using the techniques of the present invention to preserve the riblet topography.

FIGS. 20-24 illustrate embodiments of painting methods used for the primer and topcoat applications. In all cases, the surfaces were pretreated prior to painting by cleaning with Henkel Ridoline 4355 alkaline cleaner, followed by deoxidizing with Henkel 6/16 chromated deoxidization system, and then anodizing via standard boric-sulfuric acid anodizing (8 g/l boric acid and 45 g/l sulfuric acid) for approximately twenty minutes at 15 volts and about 80° F., followed by a dilute chrome seal at about 195° F. for approximately twenty-five minutes.

Electrostatic spraying systems use paint droplets that are given a negative charge in the vicinity of a positively charged substrate (such as an aluminum alloy). The droplets are attracted to the substrate and a uniform coating is formed. This system works well on cylindrical, rounded and grooved objects due to its "wrap-around" effect that nearly allows the object to be coated from one side. Very little paint is lost to overspray, and it has been noted to have a transfer efficiency of over ninety-five percent. The spreading of the charged paint droplets on the aluminum alloy surface is governed by at least two forces: surface tension and electrostatic attraction, therefore careful attention to these two forces are required. The efficacy of conventional electrostatic spraying systems depends largely on the accurate monitoring of the viscosity of the paint. If the viscosity is too large, the paint coating exhibits lumpiness. The conductivity of the paint is a measure of the paint viscosity. Higher conductivity indicates lower viscosity. In addition, the conductivity is related to how well droplets form in the spray nozzle. High conductivity permits better control of droplet size.

In an embodiment, an electrostatic spraying system is used to paint the textured surface, where careful control of the paints conductivity/viscosity helps to maintain the riblet topography. Typically, multiple passes of charged microdroplets of paint are sprayed onto the textured surface resulting in thin layers of paint adhering and wrapping around each of the multiplicity of longitudinal riblets in order to coat the riblets. The pressure of the spray nozzle can be adjusted so that a fine mist of paint having a certain viscosity is supplied to coat the textured surface. By modifying painting parameters, better read-through of the riblet topography can be possible. By using various paint systems effective read-through of the riblet topography can be possible.

As described above with reference to FIG. 19, in an embodiment, the textured surface of the aluminum alloy product is anodized 906 to coat the surface with a tailored aluminum oxide film. Suitable methods of forming a tailored aluminum oxide coatings include, but are not limited to, electrochemical oxidation (e.g., anodizing) and chemical immersion (e.g., Alodine treatments). In an embodiment, the oxide film layer can be modified by adding various particles/components, as shown in step 907. In an embodiment, anti-corrosion particles can be added to the aluminum oxide film. In an embodiment, sealant particles can be added to the aluminum oxide film. In an embodiment, organic dyes can be added to the aluminum oxide film. The addition of these particles and dyes to the aluminum oxide film can allow some or all of the painting applications to be avoided. In an embodiment, the surfaces can be chemically modified to include photo-active compounds such as anatase to yield easy/self-cleaning properties to the aluminum oxide. The modification of aluminum oxide could be induced either by incorporation within the chemical structure of the oxide or by physical impregnation within the morphology of the oxide layer.

FIGS. 20A, 20B and the table show an embodiment of a painting process for use with an aluminum alloy sheet or plate having a riblet topography to create an aluminum alloy product of the present invention after surface preparation and painting with a primer layer and a topcoat. In the embodiment depicted in FIGS. 20A and 20B, the paint delivery method for both paint systems was a suction cup, demonstrated in FIG. 20A. The specific paint conditions used are displayed in the table. FIG. 20B is a cross-sectional optical metallography image demonstrating poor telegraphing of the topography through the paint layers.

FIGS. 21A, 21B and the table show an embodiment of a painting process for use with an aluminum alloy sheet or plate having a riblet topography to create an aluminum alloy product of the present invention after surface preparation and painting with a primer layer and a topcoat. In the embodiment depicted in FIGS. 21A and 21B, the paint delivery method for both paint systems was a suction cup, demonstrated in FIG. 21A. The optimized paint conditions used are displayed in the table. FIG. 21B is a cross-sectional optical metallography image demonstrating improved telegraphing of the topography through the paint layers as compared to FIG. 20B.

FIGS. 22A, 22B and the table show an embodiment of a painting process for use with an aluminum alloy sheet or plate having a riblet topography to create an aluminum alloy product of the present invention after surface preparation and painting with a primer layer and a topcoat. A different topcoat system (Kion 1067A polysilazane) was used compared with the topcoat system of FIGS. 20A and 20B. In the robotic electrostatic painting process, the paint is electrically charged via the electrostatic power supply, then applied via an ITW Ransburg rotary bell atomizer attached to an ABB robotic arm as outlined in FIG. 22A. The ITW Ransburg RMA-101 electrostatic control unit also directs air flow to the bell atomizer to control the spray pattern, while the robotic motion is controlled by a computer interface. The electrostatic application should allow for a tighter coverage of the coating on the surface, and thus, improved telegraphing of the topography. The specific paint conditions are summarized in the table. FIG. 22B is a cross-sectional optical metallography image demonstrating very good telegraphing of the surface topography by virtue of the incorporation of a robotic electrostatic painting method for the topcoat.

FIGS. 23A, 23B and the table show an embodiment of a painting process for use with an aluminum alloy sheet or plate having a riblet topography to create an aluminum alloy product of the present invention after surface preparation and painting with a primer layer and a topcoat. In the embodiment depicted in FIGS. 23A and 23B, a manual electrostatic operation is employed, where the paint is charged at the gun orifice. Similar to the robotic electrostatic operation of FIG. 22A, the application of a charge to both paint systems should maximize the ability to "attach" to the surface topography. A schematic of the manual electrostatic operation using a suction cup delivery method is shown in FIG. 23A. The electrostatic painting conditions for the primer and topcoat are outlined in the table. FIG. 23B is a cross-sectional optical metallography image demonstrating excellent telegraphing of the underlying topography through the paint layers by virtue of manual electrostatic painting of both the primer and topcoat layers.

Electrophoretic (electrodeposition or E-coat) painting refers to a process involving the aluminum part polarized anodically (anodic electropainting) or polarized cathodically (cathodic electropainting). The cleaned aluminum alloy product having a friction-reducing textured surface is immersed in a tank of electrodeposition paint, and the current is turned on, so that polarization of the aluminum is induced with respect to a counter electrode and the paint particles are attracted to the surface.

FIGS. 24A, 24B and the table show an embodiment of a painting process for use with an aluminum alloy sheet or plate having a riblet topography to create an aluminum alloy product of the present invention after surface preparation and painting with a primer layer and a topcoat. In the embodiment depicted in FIGS. 24A and 24B, an electrophoretic process was employed. The electrophoretic process involves diffusion of the paint through the electrolyte by attraction to the negative charged part (cathode), such that tight adhesion of the paint is achieved, the process is depicted in FIG. 24A. The paint conditions used in this case are presented in the table. FIG. 24B is a cross-sectional optical metallography image demonstrating that partial telegraphing of the paint system is achieved by first using an electrophoretically deposited epoxy paint system for the primer, followed by a suction cup application of a polyurethane topcoat.

Figure 25A:
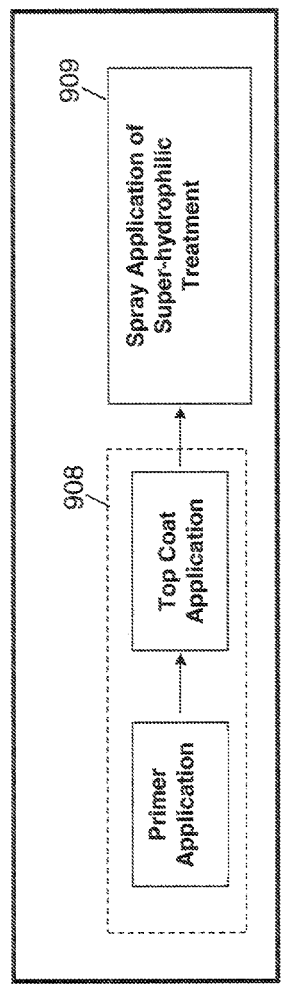
FIGS. 25A and 25B show two different embodiments for a method of preventing contamination of the aluminum alloy product having a permanent rolled riblet topography of the present invention.
Figure 25B:
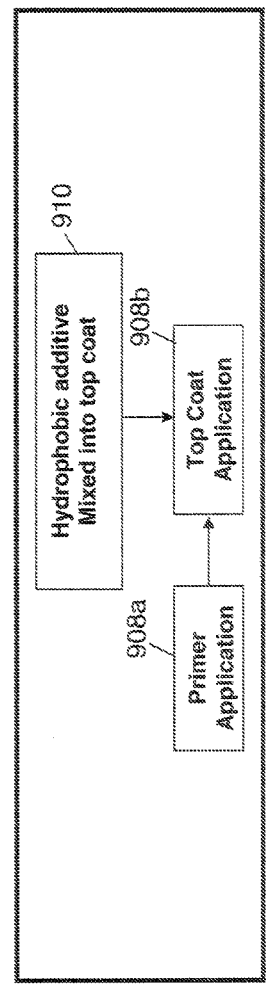
Figure 30A:
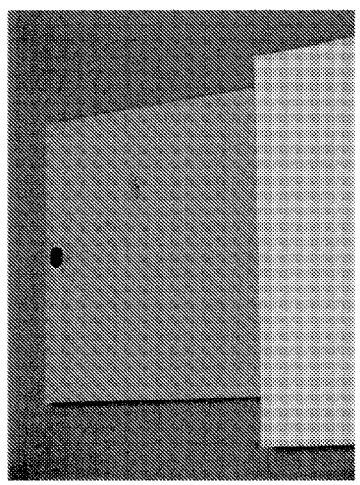
FIG. 30A-D show the results of an experiment in which impregnating seal compounds, in tandem with an easy/self-cleaning system, exhibited better inherent cleanability than a standard painted with or without an easy/self-cleaning system, illustrating an embodiment of the present invention.
Figure 30B:
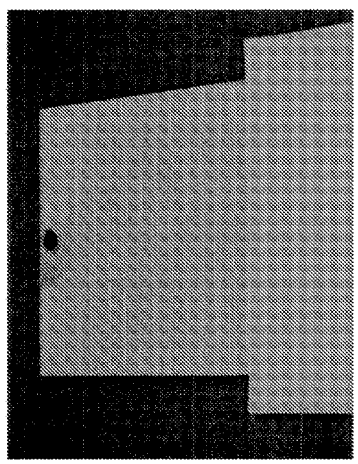
Figure 30C:
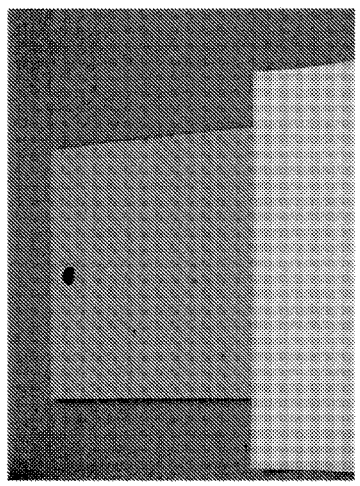
Figure 30D:
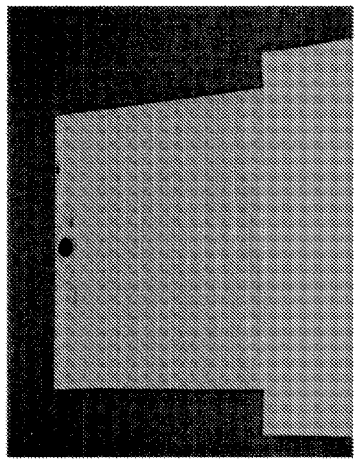

In one embodiment of the present invention, the metal sheets and plates are easy/self-cleaning such that contaminants are prevented from building up on the friction-reducing textured surface. Two embodiments are illustrated that can impart an "easy/self-cleaning" capability to the friction-reducing textured surface. The method flow paths are shown in FIGS. 25A and 25B. The specific chemistries to be used for either of these two methods may depend at least in part on the shape and dimensions of the riblet topography. In an embodiment, a metal sheet and plate having a riblet topography is manufactured as disclosed in one of the flow paths of FIGS. 10-17, and is then imparted with an easy/self-cleaning capability using the techniques of the present invention to preserve the riblet topography. In an embodiment, a metal sheet and plate having a riblet topography is manufactured in, for example, an OEM facility using other methods, and is then imparted with an easy/self-cleaning capability using the techniques of the present invention to preserve the riblet topography.

As shown in the embodiment depicted in FIG. 25A, the painting practices of the invention 908 (see FIG. 19) are employed, followed by the spray application 909 of a super-hydrophilic coating or coatings over the paint topcoat. Alternatively, the super-hydrophilic coating can be sprayed directly onto an aluminum alloy or titanium alloy product of the present invention without first requiring a primer or a topcoat layer. A super-hydrophilic coating is completely and instantaneously wet by water, i.e., exhibiting water droplet advancing contact angles of less than about five degrees within 0.5 seconds or less upon contact with water. Photochemically active materials such as titanium dioxide ($TiO_2$) can become super-hydrophilic after exposure to UV radiation; or, if treated with suitable chemical modifications, visible radiation. In an embodiment, the super-hydrophilic coating is a light-activated system containing anatase titanium dioxide (TOTO system), which relies largely on an interaction of this material with light and water to prevent contaminates from collecting on the surface. While water is a key element in the self-cleaning mechanism, materials treated with this type of self-cleaning system may also exhibit an inherent ability to repel dirt to some degree even without the presence of water.

As shown in the embodiment depicted in FIG. 25B, a primer layer 908a is first applied to the surface having the riblet topography as described above for FIG. 19, and then the topcoat 908b is enhanced with a chemical additive 910, potentially used across a range of concentrations in the paint. This type of system would be designed to impart a chemically and topographically (on a micro-scale) hydrophobic characteristic to the riblet topography surface. This hydrophobic component would allow water to bead on the riblet topography surface. This beading action in turn allows the water droplets to easily remove contaminants from the riblet topography surface as they roll across the surface. In an embodiment, the chemical additive 910 is a functionalized siloxane system such as BYK Silclean 3710 that results in a superhydrophobic (water-repelling) surface. Again, materials treated in this fashion may exhibit an inherent ability to repel dirt to some degree even without the presence of water.

In addition to the chemical and mechanistic differences between the systems, the method in which they are applied to the surface is different. FIGS. 26A-C demonstrate that an aluminum alloy product having friction-reducing textured surfaces of the present invention augmented with an easy/self-cleaning component is able to exhibit improved cleanliness over a painted topography with no easy/self-cleaning component. In an embodiment, the TOTO system is based on either spray or immersion application of several layers of the TOTO solutions atop the topcoat paint layer, as illustrated in FIG. 26B. The Silclean system is applied by mixing it into the topcoat paint prior to topcoat application and then spraying the topcoat onto the surface, as illustrated in FIG. 26C. The painting and easy/self-cleaning agent application conditions for the panels in the slide are shown in the table of FIG. 27. In all three cases, the panels were first cleaned in Henkel Ridoline 4355 alkaline cleaner, deoxidized with Henkel Ridoline 6/16 acid deoxidizer, then anodized with boric-sulfuric acid (8 g/l boric acid, 45 g/l sulfuric acid) for about twenty minutes at 15 volts, followed by a dilute chrome seal at 195° F. for about twenty-five minutes.

As illustrated in FIGS. 26A-C, after 3-week outdoor exposure in a "dusty" environment, the aluminum alloy product having friction-reducing textured surfaces with the TOTO easy/self-cleaning agent (FIG. 26B) is cleaner than the other aluminum alloy products having friction-reducing textured surfaces (FIGS. 26A and 26C). The aluminum alloy product having a friction-reducing textured surface with the Silclean cleaning agent (FIG. 26C) also exhibits a cleaner surface than the control panel with no easy/self-cleaning agent (FIG. 26A). It is believed that the aluminum alloy products of the present invention with easy/self-cleaning enhancement will likely be cleaner than aluminum alloy products without easy/self-cleaning enhancement, thus mitigating the potential effects of in-use dirt and residue on air drag performance.

The porous structure and tailored compositions of anodic oxides may be further exploited to further advance the capabilities of the friction-reducing textured surface in aerospace applications. As opposed to employing standard anodic sealing and primer/topcoat painting practices, the anodic oxide can be left unsealed, allowing for the use of organic or inorganic treatments, referred to as impregnating seal compounds (ISC's). ISC's can include coatings other than the standard aerospace coatings, such as silazanes or siloxanes, the easy/self-cleaning treatments presented FIGS. 26A-26C, or combinations thereof. The application methods for these ISC's could be either spray or immersion in nature, depending on the specific performance requirements. It is believed that this approach could obviate the need for the primer/topcoat systems currently in use for aerospace applications. Two anodizing embodiments, both with an affinity for the potential use of ISC's, are illustrated below. As illustrated in FIGS. 28A and 28B, the anodic oxide can be specifically tailored to generate a nodular structure in which the nodules are approximately two orders of magnitude thinner than the core columnar structure observed in boric-sulfuric or sulfuric acid anodizing. The nodular structure is generated through the use of another "mixed electrolyte" anodizing method, consisting of a combination of sulfuric, phosphoric and boric acids. The nodular structure can impart both enhanced performance capabilities and an affinity for various ISC's. In FIGS. 29A and 29B, standard boric-sulfuric or sulfuric acid anodizing may be employed without a subsequent sealing step. A selected ISC may then be introduced into the columnar anodic structure associated with these anodizing methods. In FIGS. 30A-30D, the easy/self-cleaning performance of selected unsealed anodic oxide/ISC/easy/self-cleaning combinations as compared to a standard painting scenario with and without easy/self-cleaning components can be observed. In this test, metal products of the present invention (with friction-reducing textured surfaces) were subjected to dirt incursion via low pressure impingement of damp wood ash. The specimen surfaces were subjected to this impingement by placing the damp wood ash in a Q-Panel QGR Gravelometer, and "shooting" it at the panels using supplied air at 10 psi for about 10 seconds. The specimens were then visually evaluated for both their inherent ability to resist dirt impingement (FIGS. 30A-30D). The anodized systems with the ISC's (polysiloxane and polysilazane) augmented with an easy/self-cleaning component clearly repelled the wood ash more effectively than the systems with standard aerospace paint systems with and without an easy/self-cleaning component.

In other embodiments, the metal products of the present disclosure can be used in fabricating portions of a transportation vessel, including, but not limited to, an aircraft or air vehicle (such as an airplane, a helicopter, a missile, a glider, a balloon, and a blimp), a land vehicle (such as a car, and a train), and a sea vehicle (such as a submarine, a yacht, an unmanned surface vehicle, an autonomous underwater vehicle, etc.). Due to peen forming and other operations to manufacture wing skins and the requirement of alignment of riblets with wing sweep (the drag reduction effects diminish otherwise), it may not be feasible to roll riblets directly on a wing skin plate/sheet. However, the rolled riblet aluminum alloy products in the format of appliqué of the present disclosure can be bonded mechanically and/or adhesively to conventionally produced upper and lower wing skins. The riblets on the rolled riblet aluminum alloy products of the present disclosure are aligned with wing sweep. The rolled riblet aluminum alloy products for aircraft wings can vary in width, gage, and alloy for considerations of easy and cost effective manufacturability, corrosion performance, aircraft manufacturer/model, aircraft weight requirement and structural/strength integrity, etc. For example, if the alloy selected for the rolled riblet product is a 1XXX series alloy, the product can provide good corrosion benefits. The widths of the rolled riblet product can range from about five inches to about two hundred inches. The riblet (groove) direction is typically in the rolling direction (perpendicular to the width direction) but it is possible to cut pieces of the aluminum alloy sheet and roll the riblets in the transverse direction or at some angle relative to the sheet rolling direction. In some embodiments, the alloy can be aluminum 1XXX, 3XXX, 5XXX, 6XXX, 7XXX, 8XXX series alloys, as well as an Al—Li alloy. The aluminum alloy used can be either a heat-treatable or a non-heat-treatable alloy. For the non-heat-treatable sheet, the riblet rolling can be conducted in a strain hardened condition (H temper) or an annealed condition (O temper). The riblet rolling for the heat-treatable sheet can be done either before or after solution heat treatment. For the case where riblet rolling is conducted prior to solution heat treatment, the riblet rolling can be done on as-rolled material (F temper) or annealed material (O temper), and the riblet rolling can be performed either cold or at an elevated temperature. Following riblet rolling the sheet can be heat treated, quenched and aged by either natural aging or artificial aging. For the case where riblet rolling is done after solution heat treatment the rolling can be done on freshly quenched material (W temper), naturally aged material (T3 temper) or in an artificially aged temper such as T6 or T7 tempers. The rolled riblet sheet can be bare or Alclad. The gage can range from, for example, about 0.0010 inches to about 0.300 inches. The rolled aluminum riblet sheet can be applied to new or existing aluminum aircraft wings.

In further embodiments, all of the riblets topographies disclosed herein can also be rolled on titanium sheet or foil. The rolling process can be in the format of hot rolling or cold rolling. In an embodiment, the rolling process is hot rolling. For hot rolling, the rolling temperature range is between about 400° C. (752° F.) and about 1100° C. (2012° F.). The rolling reduction is in the range of about 20% up to about 75%. For high reductions, the work-hardening effects can be minimized with rolling temperature above 800° C. (1472° F.). The recrystallization temperature is about 600° C. (1112° F.). While for cold rolling, the reduction is in the range of about 0.5% up to about 20%. The Ti riblet appliqué sheet or foil gage can be approximately 0.002 inches to approximately 0.200 inches.

Other methods of fabricating a Ti riblet appliqué sheet or foil of the present disclosure can take the format of super-plastic forming. The riblet topographies can be rolled on Ti sheet or foil with temperature of about 840° C. (1544° F.) to about 870° C. (1598° F.) with extremely slow rolling speed with strain rate of approximately 0.0001/s to approximately 0.001/s. The reduction can be in the range of about 20% up to about 300%.

In still other embodiments, the metal products of the present disclosure can be used in fabricating portions of a sea vehicle, including, but not limited to, a submarine, a yacht, an unmanned surface vehicle, and an autonomous underwater vehicle. In an embodiment, the multiplicity of adjacent permanently rolled longitudinal riblets results in a friction-reducing textured surface sufficiently designed to provide a drag reduction ranging, for example, from about five percent up to about fifteen percent. In an embodiment, the metal product is a high-strength, low-alloy steel that is covered by SAE specifications J410, J1392, and J1442 as well as ASTM specifications A242, A440, A441, A572, A588, A606, A607, A618, A633, A656, A690, A709, A714, A715, A808, A812, A841, A860, and A871. The rolling process can be in the format of hot rolling or cold rolling. For hot rolling, the rolling temperature range is between about 720° C. (1328° F.) and about 1050° C. (1922° F.). The rolling reduction can vary in a wide range with a typical final riblet rolling pass reduction exceeding about 50%. Cooling after riblet rolling can be proceeded at a range between about 10° C. per minute and about 300° C. per minute. A fast cooling rate is desirable in order to achieve finer ferrite grain size and therefore higher strength. For cold rolling at room temperature, the rolling reduction ranges from about five (5) % to about eighty (80) %. The cold rolling process is followed by an annealing process with an annealing temperature range of about 400° C. (752° F.) to about 700° C. (1292° F.). The annealing time varies depending on the specified microstructure and property requirements.

Both aircraft engineers who build aircraft wings and propellers, and wind turbine engineers who design rotor blades are concerned with aerodynamic drag. An aircraft should have good fuel economy, and wind turbine rotor blades must have high tip speeds to work efficiently. Therefore it is important, that both aircraft wings and rotor blades have low aerodynamic drag. In an embodiment, the present invention is directed to a rotor blade that includes at least one metal product having at least one surface that is substantially grooved, wherein the substantially grooved surface forms a riblet topography, the riblet topography including a multiplicity of adjacent permanently rolled longitudinal riblets running along at least a part of the surface, and wherein the riblet topography is coated with at least one coating sufficiently designed and applied to preserve the riblet topography. In an embodiment, the multiplicity of adjacent permanently rolled longitudinal riblets results in a friction-reducing textured surface sufficiently designed to provide a drag reduction ranging from about five percent up to about fifteen percent. In an embodiment, the reduced drag increases the energy that can be generated at the same wind speed.

Frictional pressure loss, or drag, in a pipeline system is a waste of energy and it can economically affect the operation of a pipeline system. Drag-reducing agents (DRA) are used by some liquid and gas pipeline operating companies to minimize flow turbulence and, hence, to increase throughput and thus reduce the pipelines' operating costs. While DRA is an effective capacity increase agent, its use is expensive over the long term. In still other embodiments, the metal products of the present disclosure can be used in fabricating a pipeline system. In an embodiment, the multiplicity of adjacent permanently rolled longitudinal riblets results in a friction-reducing textured surface sufficiently designed to provide a drag reduction ranging, for example, from about five percent up to about thirty percent. In an embodiment, the reduced drag decreases energy loss by reducing friction along the pipeline wall.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A transportation vessel comprising:
    at least one metal product having a surface comprising:
        a substantially grooved riblet topography including a multiplicity of adjacent permanently rolled longitudinal riblets running along at least a part of the surface;
        an aluminum oxide film coating on the riblet topography;
        a first organic primer layer applied to the coated riblet topography; and
        a second topcoat layer applied over the first organic primer layer,
        wherein the first organic primer layer and the second topcoat layer provide a substantially constant thickness coating along the entire surface of the riblet topography to preserve the riblet topography while simultaneously providing corrosion protection and self-cleaning capability to the riblet topography.

2. The transportation vessel of claim 1 wherein the multiplicity of adjacent permanently rolled longitudinal riblets results in a friction-reducing textured surface.

3. The transportation vessel of claim 1 wherein the metal product is an aluminum alloy sheet or plate.

4. The transportation vessel of claim 3 wherein the sheet or plate is fabricated from an Alclad aluminum alloy.

5. The transportation vessel of claim 3 wherein the metal product is a titanium sheet or plate.

6. The transportation vessel of claim 3 wherein the metal product is a steel sheet or plate.

7. The transportation vessel of claim 1 wherein the riblet topography includes at least one hundred adjacent permanently rolled longitudinal riblets.

8. The transportation vessel of claim 1 wherein the multiplicity of adjacent permanently rolled longitudinal riblets are evenly spaced a distance apart.

9. The transportation vessel of claim 8 wherein the distance ranges from about 25 µm to about 5.0 mm.

10. The transportation vessel of claim 1 wherein each of the multiplicity of adjacent permanently rolled longitudinal riblets have a peak height between about 25 µm to about 5.0 mm.

11. The transportation vessel of claim 1 further comprising an easy/self-cleaning coating.

12. The transportation vessel of claim 1 wherein the primer layer is an epoxy primer.

13. The transportation vessel of claim 1 wherein the topcoat layer is a polyurethane topcoat.

14. The transportation vessel of claim 11 wherein the easy/self-cleaning coating is a super-hydrophilic coating.

15. The transportation vessel of claim 14 wherein the super-hydrophilic coating is a light-activated system containing anatase titanium dioxide.

16. The transportation vessel of claim 1 wherein a hydrophobic chemical additive is added to the topcoat layer.

17. The transportation vessel of claim 16 wherein the hydrophobic chemical additive is a functionalized siloxane system.

18. The transportation vessel of claim 1 wherein the metal product is used in fabricating at least a portion of an aircraft.

19. The transportation vessel of claim 1 wherein the metal product is used in fabricating at least a portion of a rotor blade.

20. The transportation vessel of claim 1 wherein the organic primer layer has a thickness of between 25 µm and 65 µm.

21. The transportation vessel of claim 1 wherein the topcoat layer has a thickness of between 25 µm and 65 µm.

22. The transportation vessel of claim 1 further comprising a third super-hydrophilic coating layer over the second topcoat layer, wherein the first organic primer layer, the second topcoat layer, and the third super-hydrophilic coating layer provide a substantially constant thickness coating along the entire surface of the riblet topography to preserve the riblet topography while simultaneously providing corrosion protection and self-cleaning capability to the riblet topography.

* * * * *